United States Patent [19]
Kobayashi et al.

[11] Patent Number: 5,561,686
[45] Date of Patent: Oct. 1, 1996

[54] RADIO INFORMATION COMMUNICATION SYSTEM USING MULTI-CARRIER SPREAD SPECTRUM TRANSMISSION SYSTEM

[75] Inventors: Hiroshi Kobayashi, Tokyo; Hideaki Haruyama, Fujisawa; Motomitsu Yano, Ohmiya; Kouichiro Kamura; Kazuyoshi Ozawa, both of Yokohama, all of Japan

[73] Assignee: Kabushiki Kaisha Toshiba, Kanagawa-ken, Japan

[21] Appl. No.: 193,088

[22] PCT Filed: Aug. 24, 1992

[86] PCT No.: PCT/JP92/01062

§ 371 Date: Feb. 23, 1994

§ 102(e) Date: Feb. 23, 1994

[87] PCT Pub. No.: WO93/04546

PCT Pub. Date: Mar. 4, 1993

[30] Foreign Application Priority Data

Aug. 23, 1991 [JP] Japan ..................... 3-211886
Aug. 23, 1991 [JP] Japan ..................... 3-211887
Nov. 8, 1991 [JP] Japan ..................... 3-292588

[51] Int. Cl.$^6$ .................................................. H04K 1/00
[52] U.S. Cl. .................................................. 375/200
[58] Field of Search ...................................... 375/1

[56] References Cited

U.S. PATENT DOCUMENTS

| 3,916,313 | 10/1975 | Lowry | 325/30 |
| 4,355,399 | 10/1982 | Timor | 375/1 |
| 4,515,852 | 5/1985 | Katabe et al. | |
| 4,584,678 | 4/1986 | Ozeki et al. | |
| 5,029,183 | 7/1991 | Tymes | 375/1 |

FOREIGN PATENT DOCUMENTS

| 0084967A3 | 1/1983 | European Pat. Off. |
| 0085753A1 | 8/1983 | European Pat. Off. |
| 0095959A1 | 12/1983 | European Pat. Off. |
| 0164749A3 | 12/1985 | European Pat. Off. |
| 58-161438 | 9/1983 | Japan . |
| 58-178643 | 10/1983 | Japan . |
| 59-202753 | 11/1984 | Japan . |
| 61-1131 | 1/1986 | Japan . |
| 63-41259 | 8/1988 | Japan . |
| 338133 | 2/1991 | Japan . |

OTHER PUBLICATIONS

Communication from European Patent Office dated Feb. 3, 1995.
Laurence B. Milstein et al., "Coding and Modulation Techniques for Freuency–Hopped Spread–Spectrum Communications Over a Pulse–Burst Jammed Rayleigh Fading Channel," IEEE Journel on Selected Areas in Communications, SAC–3, No. 5, Sep. 1985 (New York).
"Pulsed FM(Chirp) Systems", R. C. Dixon, Spread Spectrum Systems, pp. 40–43, 1976.

*Primary Examiner*—David C. Cain
*Attorney, Agent, or Firm*—Finnegan, Henderson, Farabow, Garrett & Dunner, L.L.P.

[57] ABSTRACT

In a radio information communication system of this invention, at least part of a transmission data string is first divided into a plurality of bit strings when data is transmitted by radio in a radio station on the transmission side and a plurality of carrier waves of different frequencies are subjected to primary modulation by the divided bit strings. Then, the primary-modulated carrier waves are subjected to secondary modulation by the spread spectrum system such as the frequency hopping system or chirp system and modulated waves obtained by the secondary modulation are transmitted.

21 Claims, 15 Drawing Sheets

RADIO INFORMATION COMMUNICATION SYSTEM USING MULTI-CARRIER SPREAD SPECTRUM TRANSMISSION SYSTEM

TECHNICAL FIELD

This invention relates to a radio information communication system for constructing an information transmission network represented by a LAN (Local Area Network) by use of a radio circuit.

BACKGROUND ART

In the premises of a university, office or factory, a wired LAN using coaxial cables is often used in order to effect data transfer between information communication devices such as personal computers, work stations or facsimile devices. However, in the wired LAN, a large-scale work must be effected when the layout is changed after construction of the system. Thus, it has a problem that it is difficult to easily cope with a change in the layout after construction of the system. Therefore, recently, it is strongly required to provide a LAN using a radio circuit.

However, many factors must be taken into consideration in order to realize the radio LAN. For example, they include band-narrowing of the frequency band to be used, suppression of influences by the multipath and portabi-frequency selectivity fading, and achievement of portability of terminal devices as typical factors.

Conventionally, various studies have been made for the above various problems. However, effective solutions are not yet provided.

DISCLOSURE OF INVENTION

A first object of this invention is to provide a radio information communication system for permitting the radio information communication of high quality to be effected by suppressing influences by the frequency selectivity fading and multipath.

A second object of this invention is to provide a radio information communication system for permitting the high quality communication to be effected by suppressing influences by interfering waves even when an interfering wave generating source is present in or near the radio area.

A third object of this invention is to provide a radio information communication system which makes it possible to suppress influences by the frequency selectivity fading and multipath without using a complicated signal process and large-scale antenna, thereby permitting a radio station to be easily constructed at low cost and providing sufficient portability due to the small size and light weight for the radio station.

A fourth object of this invention is to provide a radio information communication system capable of suppressing a frequency band to be used to a narrow bandwidth.

A fifth object of this invention is to provide a radio information communication system capable of reducing the data discarding ratio by permitting data re-transmission, thereby making it possible to keep the throughput high.

A sixth object of this invention is to provide a radio information communication system and an error correction method capable of efficiently correcting errors occurring in a reception bit string.

A seventh object of this invention is to provide a radio information communication system for permitting the same frequency to be used in a plurality of adjacent radio zones by steadily avoiding collision between transmission information items, thereby making it possible to enhance the utilization factor of the frequency.

This invention is constructed as follows in order to attain the above first to fourth objects. That is, when transmission data is transmitted by radio in a radio information communication terminal device on the transmission side, at least part of a transmission data string is first divided into a plurality of bit strings. A plurality of carrier waves having different frequencies are subjected to the primary modulation by use of the divided bit strings. Then, each of the primary-modulated carrier waves is subjected to the secondary modulation by the spread spectrum system and a modulated wave obtained by the secondary modulation is transmitted.

Therefore, according to this invention, the data string is divided into a plurality of bit strings which are then transmitted in parallel. For this reason, the transmission speed of each bit string can be made low. Therefore, it becomes possible to set time for one symbol of the carrier wave modulated by each bit string sufficiently long in comparison with the maximum delay spread (delay spread) amount by the multipath, thereby making it possible to suppress the influence by the multipath.

Further, as described above, the data string is divided into a plurality of bit strings which are then transmitted by radio by different carrier frequencies. Therefore, even if the frequency selectivity fading occurs, or even if an interfering wave generating source such as an electronic range is present in the near place, the possibility of the influence to be given to a plurality of carrier frequencies is small. Therefore, it is possible to restore received data based on the bit strings of carrier frequencies normally received.

Further, the spread spectrum system has a frequency diversity effect. For this reason, it is not necessary to use the high-degree waveform equalization technique and multi-beam antenna. Therefore, the radio information communication terminal device can be made simple in construction and inexpensive. Further, since the radio information communication terminal device can be reduced in size and weight, sufficient portability for the device can be provided. It is possible to suppress the frequency band used by the system to a narrow bandwidth by using the chirp system or frequency hopping system of low speed as the spread spectrum system. For this reason, it becomes possible to use a relatively low frequency band such as a quasi-microwave band. Therefore, the transmission power can be reduced, thereby making it possible to use a low-power type personal computer using a battery, for example, as a station.

Further, when the frequency hopping system or chirp system is effected, the frequency hopping window or chirp window is set and transmission of transmission data is interrupted in a period in which the window is set. As a result, there is no possibility that the timing of the frequency hopping operation or chirp operation collides with the transmission timing of the transmission data, thereby making it possible to always steadily effect the frequency hopping operation or chirp operation.

In order to attain the fifth object, this invention is made to insert entire information of address information of transmission data into a plurality of bit strings without dividing the address information into a plurality of bit strings and transmit them by radio in parallel by a plurality of carrier frequencies. Further, address information is repeatedly inserted into a plurality of portions of at least one bit string and transmitted. This makes it possible to transmit the address information with redundancy by a plurality of carrier frequencies. Therefore, even if a large number of bit errors which cannot be restored into user information occur by the influence of the frequency selectivity fading or multipath, at least address information can be correctly received and reproduced by the receiving station. Therefore, in this case, a re-transmission request can be made with respect to the transmission station in the low-order layer without relying on control of the high-order layer. Therefore, significant deterioration in the throughput of the entire system can be prevented.

In order to attain the sixth object, this invention is made to create a new bit string containing an error correction signal based on at least one bit string among a plurality of divided bit strings in the radio station on the transmission side, respectively attach error detection signals to the plurality of divided bit strings and the new bit string containing the error correction signal, and transmit them. Further, in the radio station on the reception side, a bit error is detected based on an error detection signal contained in a received bit string for each of a plurality of received bit strings subjected to the primary demodulation and an error of the bit string in which a bit error is detected is corrected based on that bit string among the plurality of received bit strings which contains the error correction signal.

Further, in the radio station on the transmission side, a new bit string containing a first error correction signal is created based on at least one bit string among a plurality of divided bit strings and second error detection signals are respectively attached to the plurality of divided bit strings and the new bit string containing the first error correction signal and transmitted. Further, in the radio station on the reception side, a bit error is corrected based on the second error correction signal contained in the received bit string for each of a plurality of received bit strings subjected to the primary demodulation, and if an error remains in the result of error correction, an error of the bit string in which the error remains is corrected based on that received bit string among the plurality of received bit strings which contains the second error correction signal.

Therefore, according to this invention, even if it becomes impossible to use the carrier frequency which is part of a plurality of carrier frequencies for communication by the influence of the frequency selectivity fading or the like, an error of the bit string transmitted by use of the carrier frequency which becomes impossible to be used for communication can be restored based on the bit string transmitted by use of the other normal carrier frequency. Therefore, the high-quality radio communication can be attained.

In order to attain the seventh object, this invention is made to attach collision detecting signals to first periods of the head ends of a plurality of divided bit strings, transmit the bit strings by use of a plurality of different carrier frequencies, check whether or not a signal other than the collision detection signal transmitted by itself is included in a period containing the first period of the head ends of a plurality of received bit strings subjected to the primary demodulation, determine that collision has occurred when it is determined that the signal other than the collision detection signal transmitted by itself is included, and interrupt transmission of the transmission data.

Therefore, according to this invention, since the presence or absence of a collision of the signal is determined in each of a plurality of carrier frequencies, the presence or absence of a collision of the signal can be unfailingly detected in another normal carrier frequency even if it becomes impossible to use the carrier frequency which is part of the plurality of carrier frequencies for communication by the influence of the frequency selectivity fading or the like. Therefore, a collision between transmission information items can be steadily avoided, and as a result, the same frequency can be used in a plurality of adjacent radio zones and the effective utilization factor of the frequency can be enhanced.

BEST MODE OF CARRYING OUT THE INVENTION

Figure 1:
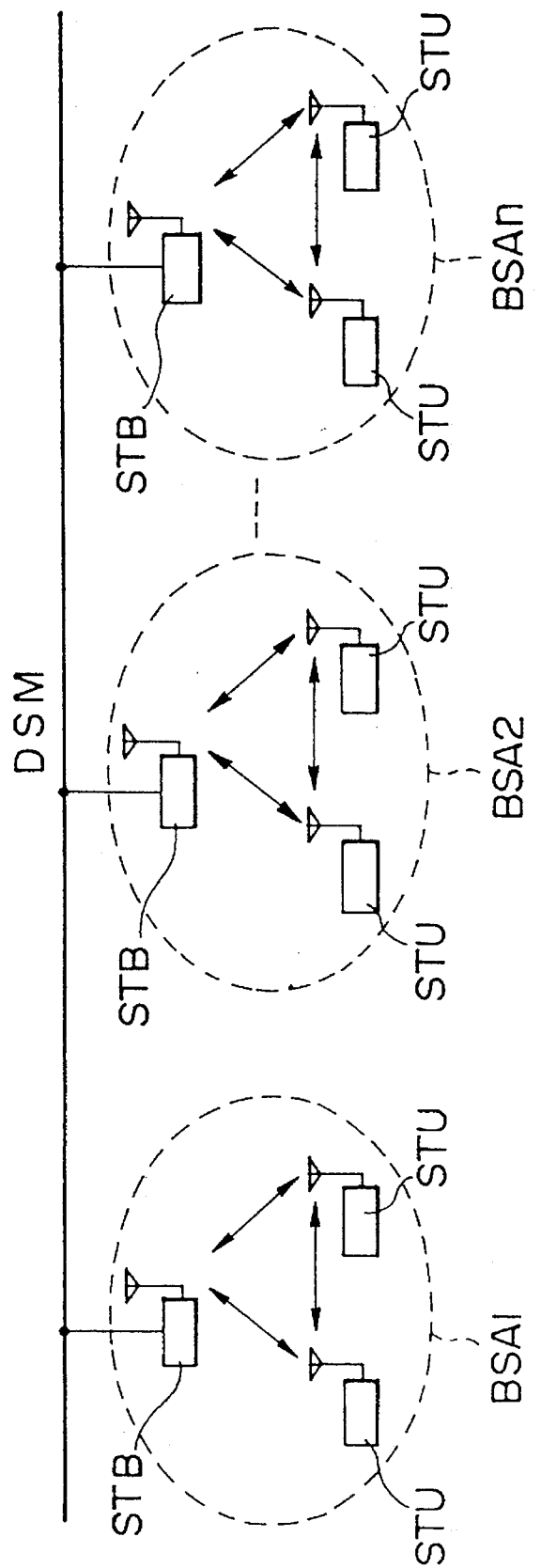
FIG. 1 is a schematic construction diagram of a uniform distribution type radio LAN system.

Before explaining the embodiment, a point which must be taken into consideration when realizing a radio LAN system is first briefly described.

1. Problems associated with a radio transmission medium (1) Reduction in the bandwidth of the frequency band In general, in a mobile radio communication system such as a car portable telephone, a plurality of radio zones are provided in a service area. The radio zones are called cells or BSA (Basic Service Area) and the radius thereof is set to 10 meters to approx. several kilometers. The reason why the radio zones are provided is that reduction in the transmission power of the radio station, the effective utilization factor of the frequency, dispersion of traffic and enlargement of the service area can be attained.

Therefore, the radio zone system is used in the radio LAN system. In the radio zone system, different frequency bands are allotted to the respective radio zones in order to prevent mutual interference between the radio zones. In order to suppress and make the mutual interference not larger than a preset interference ratio, seven frequency bands are generally required. Further, in a case where a toll center called a base station is provided for each of the radio zones as in the normal mobile radio communication system, each of the radio stations used as a mobile station effects the mutual radio communication via the toll center and therefore requires 14 frequency bands in total. That is, an extremely wide frequency band is required in the entire radio LAN system. For example, if the data transmission speed is set to 10 Mbps, and at the same time, transmission data is subjected to the error correction coding corresponding to a (43, 31) BCH code and QPSK is used as the modulation system, the frequency band for each radio zone becomes 10 MHz and the total frequency band of 140 MHz is required.

On the other hand, in the radio system, if the antenna gain (directivity) is made constant, a larger transmission power which is proportional to the square of the frequency used is required as a higher frequency is used. However, the electric power which can be supplied from an information communication device such as a so-called lap-top type or book type personal computer to the radio unit is generally not larger than 500 mW. For this reason, the bandwidth which can be used as the frequency band is practically limited to a relatively low frequency band such as a quasi-microwave band, for example.

However, the quasi-microwave band is already used or will be used in most existing radio systems such as mobile band communication systems or radar systems for radiolocation. Therefore, it is almost impossible to attain the frequency band which is as wide as 140 MHz as described before for the radio LAN system in the quasi-microwave band, and in practice, only the frequency band which is as narrow as 40 MHz to 50 MHz can be attained.

(2) Suppression of influence by the multipath

In an enclosed environment such as a space in a building or in a city in which buildings stand close together, radio waves reflect on walls, ceilings, various types of utensils, and buildings and the same radio wave may reach the same radio station via a plurality of different paths. This phenomenon is called a multipath. When the multipath occurs, delay spread occurs between a plurality of radio waves. For example, it is observed that delay spread of 270 nsec at maximum lies in the building. The delay spread becomes a large factor causing the interference between codes. For example, if data transmitted at a transmission speed of 10 Mbps is subjected to the error correction coding corresponding to the (43, 31) BCH code and QPSK modulation, one symbol period of the radio data becomes 144 nsec. Therefore, in this case, occurrence of the interference between codes by the delay spread (270 nsec) cannot be avoided.

(3) Suppression of influence by frequency selectivity fading

The cause of generation of the frequency selectivity fading is basically the same as the cause of generation of the multipath described before. When the frequency selectivity fading occurs, the received signal level fluctuates in a range which is as large as 50 dB. It is observed that, in the past, the frequency selectivity fading occurred in a range of 2 to 5 MHz, and as a result, the communication became impossible.

As one means for alleviating the influence by the frequency selectivity fading and multipath, it is proposed to effect the waveform equalization on the reception side. However, in order to effect the waveform equalization, an extremely complicated signal process or circuit is generally required. For this reason, the complicated circuit construction and high cost of the radio station cannot be avoided.

(4) Suppression of influence by interfering waves generated from another radio wave generation source using the common frequency band The bandwidth in which the frequency band of 40 MHz to 50 MHz can be attained in the quasi-microwave band contains a 2.4 GHz band which is one of ISM bands. However, the bandwidth is already used by another wave generation source such as an electronic range. For this reason, if the bandwidth is used, the radio station will receive strong radio wave interference from the radio generation source, and as a result, deterioration in the communication quality is caused.

2. Problems on the architecture of the radio LAN system (1) Adoption of equal spread system The equal spread system is a system in which each user radio station independently effects the search of the radio circuit and connection control thereof, directly connects the user radio stations to each other without passing the toll center and effects the communication. This system has advantages that the frequency bandwidth necessary for the system can be reduced to one half of the bandwidth of the centralization system and the enhancement of the reliability of the entire system caused by having no toll center and reduction in the initial installation cost can be attained.

(2) Prevention of mutual interference between radio zones

FIG. 1 is a schematic construction diagram showing one example of a radio LAN system using the equal spread system. The system has a plurality of radio zones BSA1 to BSAn. The radii of the radio zones BSA1 to BSAn are set to 20 to 50 meters. A plurality of user radio stations STU are provided in each of the radio zones BSA1 to BSAn. Further, a distribution station STB is provided in each of the radio zones BSA1 to BSAn. The distribution stations STB have a function of bridge or router and connect the user radio stations STU in the respective radio zones BSA1 to BSAn to a distribution system DSM. The distribution system DSM connects the stations STU in the radio zones BSA1 to BSAn to one another via a wired line. Therefore, each of the user radio station STU can communicate with not only another user radio station in the same radio zone BSA but also a user radio station in another radio zone BSA via the distribution system DSM.

Figure 2A:
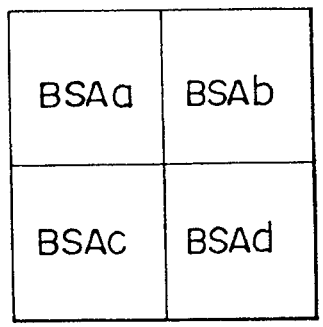
FIG. 2A to FIG. 2C are diagrams showing examples of the construction of the radio LAN system having different radio zones.
Figure 2B:
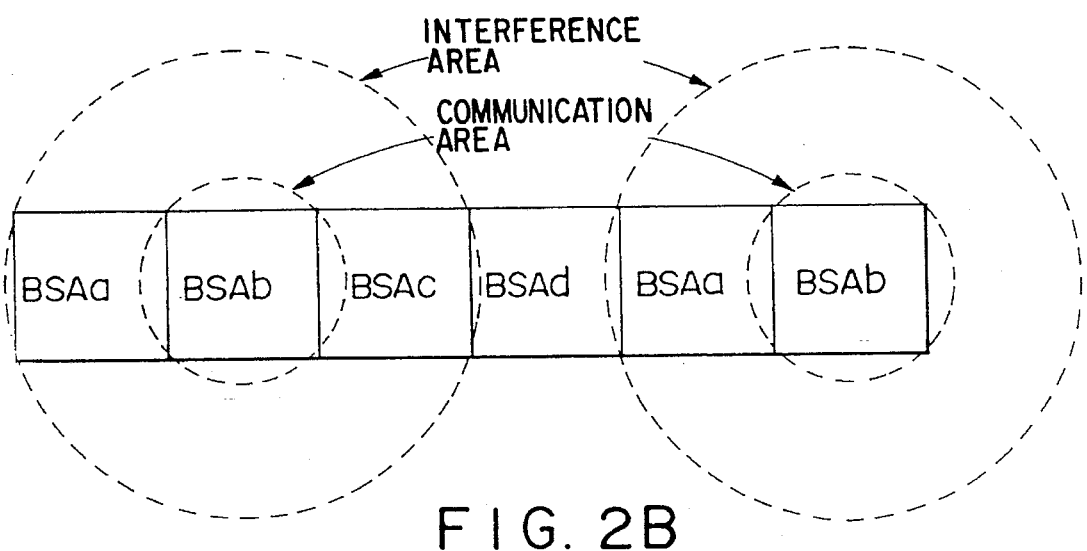
Figure 2C:
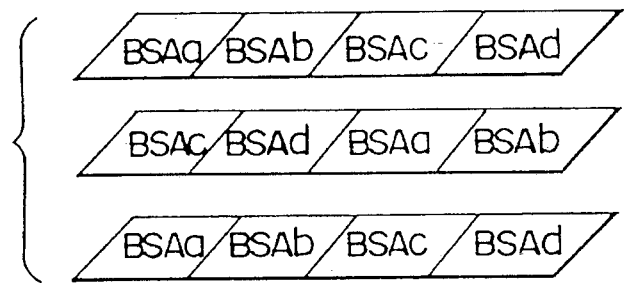

FIGS. 2A to B show an example of the arrangement of the radio zones of a radio LAN system applied to an office building, for example. FIG. 2A shows the two-dimensional arrangement of four radio zones BSAa to BSAd and frequency bands which are set different from one another so as not to interfere with one another are allotted to the respective radio zones BSAa to BSAd. FIG. 2B shows the arrangement obtained by linearly and repeatedly disposing four radio zones BSAa to BSAd and the same frequency bands are respectively allotted to the four radio zones BSAa to BSAd of each set. The reason why the frequency band can be repeatedly allotted is that two radio zones to which the same frequency band is allotted are disposed at a far distance from each other. FIG. 2C shows a plurality of groups each of which includes four radio zones BSAa to BSAd linearly arranged in a horizontal direction in the drawing and which are arranged in a vertical direction in the drawing with the arrangement order thereof set different. In this case, since the arrangement order of the radio zone groups BSAa to BSAd linearly arranged is different in each radio zone group, no interference occurs.

(3) Positive detection of data collision

In the LAN system, a CSMA/CD (Carrier Sence Multiple Access With Collision Detection) system is often used as an access system between stations. The important thing when realizing a radio LAN system using the CSMA/CD system is to attain the compatibility with the high-order layer represented by an AUI (Attachment Unit Interface), for example. If the compatibility is attained, an high-order communication software which an existing information communication device has can be used as it is without any change. In order to attain the compatibility, it is necessary to steadily and equally detect data collision on the assumption that the equal spread system is used.

For this reason, the inventors of this application proposed the following collision detection system. That is, a preset number of pulses are sent at a random interval before sending a data packet. Then, it is checked whether or not pulses of a number larger than the preset number are present on the radio transmission path. If it is determined as the checking result that pulses of a number exceeding the preset number are present, it is regarded that a collision will occur.

Figure 3:
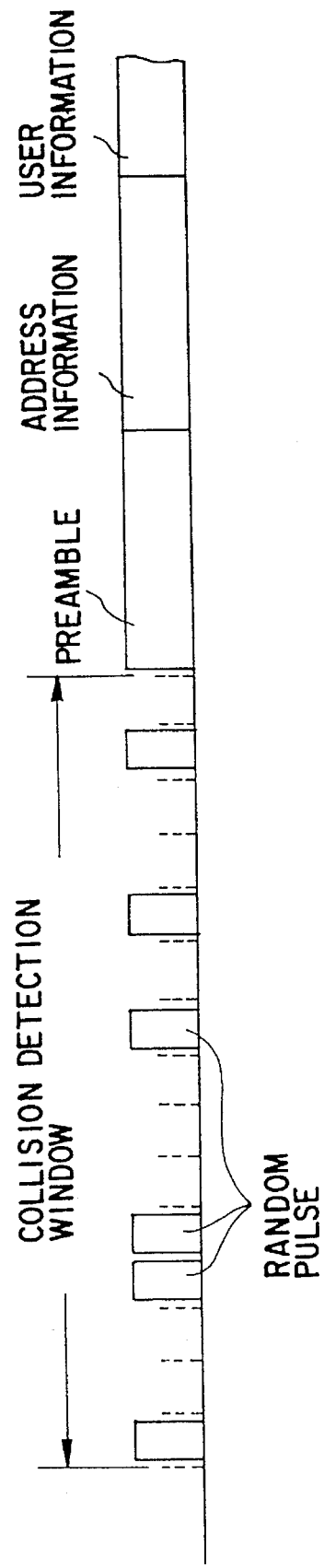
FIG. 3 is a diagram showing one example of the construction of a collision detection window.
Figure 4:
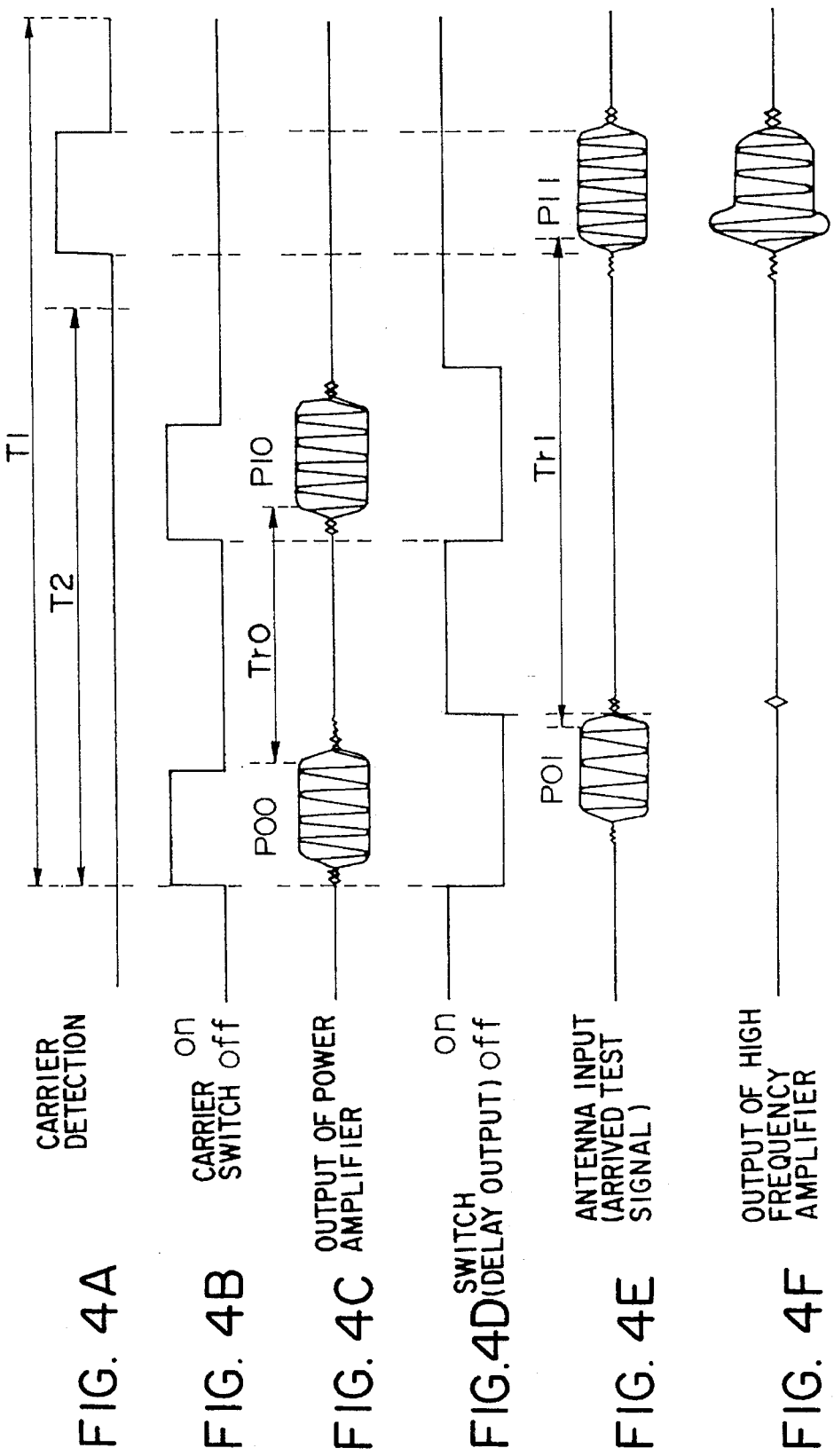
FIG. 4A to FIG. 4F are signal waveform diagrams for illustrating one example of the collision detecting operation using random pulses.

FIG. 3 shows one example of the format of a transmission data packet for effecting the above detection system. A collision detection window is provided before a preamble signal. In the collision detection window, a preset number of collision detection pulses are output at random timings.

FIG. 4A to FIG. 4F are timing diagrams showing one example of a transmitting and receiving operation of the collision detection pulse. Assume now that a first collision detection pulse P01 transmitted from another radio station has reached an antenna at substantially the same timing as the timing at which its own radio station has transmitted a first collision detection pulse P00. In this case, however, since its own radio station is transmitting the collision detection pulse P00, a carrier switch provided in the receiver system is set in the OFF state. Therefore, the collision detection pulse P01 will not appear on the output of a receiver amplifier. On the other hand, assume that its own radio station transmits a second collision detection pulse P10 when a random period Tr0 has elapsed after the transmission timing of the collision detection pulse P00 and the other station transmits a second collision detection pulse P11 when a random period Tr1 has elapsed after the transmission timing of the collision detection pulse P01. In this case, the possibility that the transmission timing of the collision detection pulse P10 by its own radio station becomes different from the arrival timing of the collision detection pulse P11 from the other radio station as shown in the drawing is high. For this reason, the reception signal of the collision detection pulse P11 appears on the output of the reception high frequency amplifier. Therefore, occurrence of the collision can be detected by monitoring the output of the reception high frequency amplifier.

If a period T2 for sending the collision detection pulse is set long, the number of combinations of timings at which collision detection pulses are transmitted at random increases. Further, the number of collision detection pulses transmitted also increases. Therefore, the precision of detection of collision becomes high.

(4) Positive transmission of address information

As one of important factors for efficiently operating the LAN system, there is a packet discarding ratio.

In the radio transmission path, if a burst error or bit error which is serious so as not to be corrected by the error correction code occurs, for example, address information is destroyed and the transmission destination and transmitting source cannot be determined at all. In this case, whether the re-transmission in the high-order layer is necessary or not must be determined in the station of transmission source and the throughput of the station is considerably deteriorated. If the above state occurs in a station such as a host computer in which the traffic is centralized, a large influence is given to the data transmission of the entire system.

For this reason, it is extremely important to steadily transmit address information and the target of the packet discarding ratio for the LAN system is set equal to or less than $5 \times E^{-5}$ in IEEE802.11.

(5) Reduction in communication outage

In the radio LAN system, there is a possibility that communication becomes impossible between specified radio stations by the influence of the frequency selectivity fading and multipath described before. In IEEE802.11, the target value of the communication outage in the radio LAN system is set to be 0.1% in the service area and not larger than 0.1% for one day.

This invention is made to solve the above problems and the embodiment thereof is explained below.

(First Embodiment)

This embodiment utilizes a multi-carrier frequency hopping (MCFH) system and the system is applied to the radio LAN system (for example, FIG. 2A) having four radio zones BSAa to BSAd.

Figure 5:
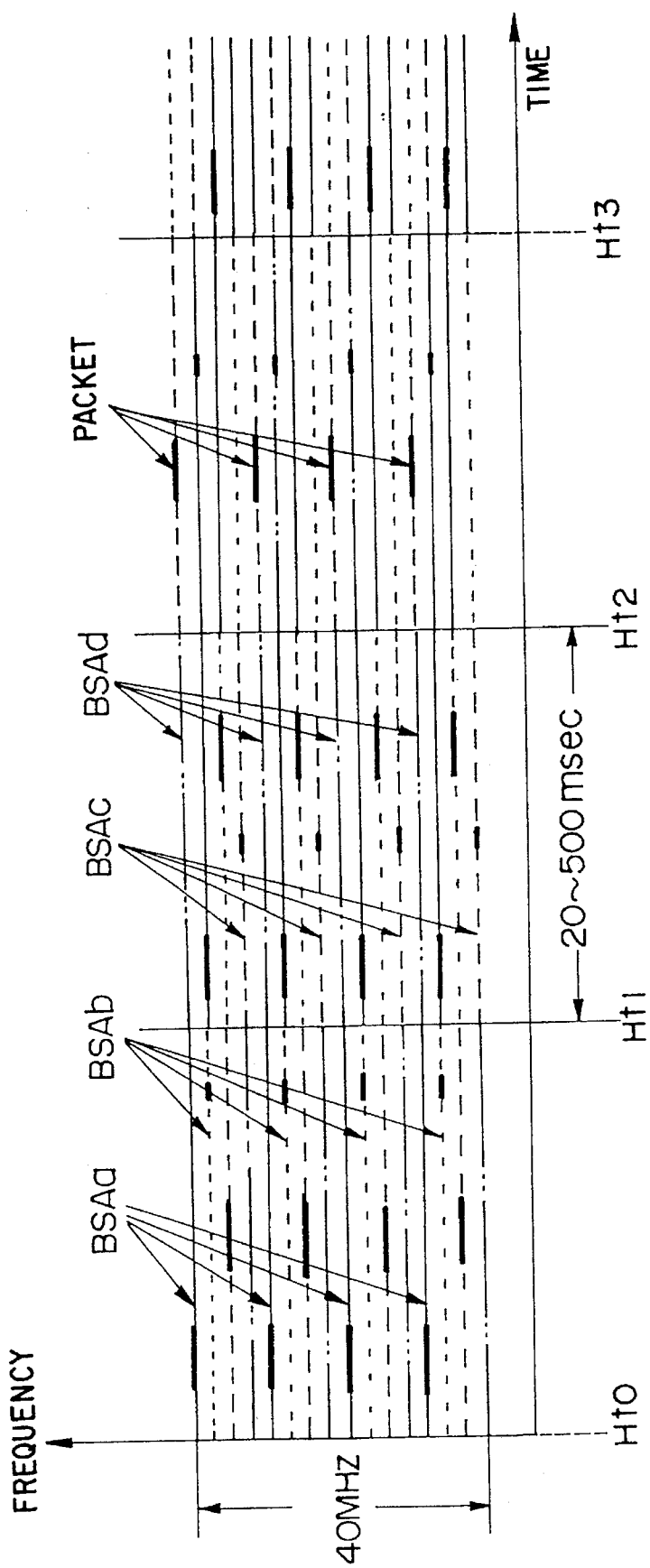
FIG. 5 is a diagram showing the arrangement and configuration of the carrier frequency by the multi-carrier frequency hopping system according to a first embodiment of this invention.

The system of this embodiment has carrier frequencies of 16 waves in total. The interval of each carrier frequency is set to 2.5 MHz. For this reason, the total sum of the frequency bands of 16 waves is 40 MHz. The carrier frequencies of the 16 waves are divided into four groups for every four frequency waves. The four groups of carrier frequencies are allotted to four radio zones BSAa to BSAd. The arrangement and configuration of the carrier frequencies allotted to the radio zones BSAa to BSAd are shown in FIG. 5.

Figure 6:
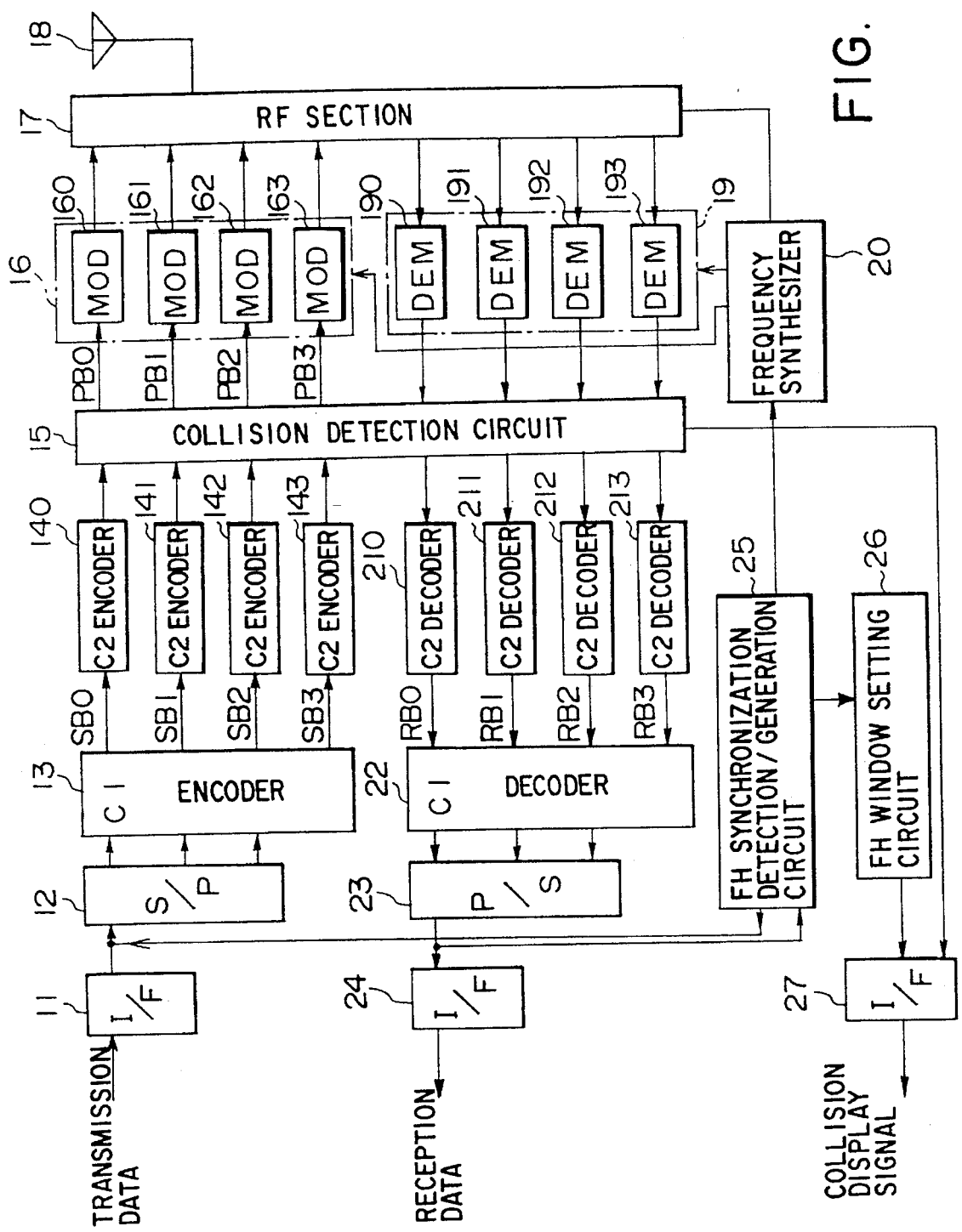
FIG. 6 is a circuit block diagram showing the construction of a radio unit of a user radio station according to the first embodiment of this invention.

FIG. 6 is a circuit block diagram showing the construction of a radio unit of a radio station used in a system of this embodiment. The radio unit includes a transmission interface section 11, serial/parallel converter (S/P) 12, C1 encoder (external encoder) 13, four C2 encoders (internal encoders) 140 to 143, collision detection circuit 15, modulating section 16 having four modulators (MOD) 160 to 163, high frequency section (RF section) 17, and antenna 18, and further includes a demodulating section 19 having four demodulators (DEM) 190 to 193, frequency synthesizer (SYN) 20, four C2 decoders (internal decoders) 210 to 213, C1 decoder (external decoder) 22, parallel/serial converter (P/S) 23, reception interface section 24, frequency hopping synchronization detection/generation circuit (FHDET/GEN) 25, frequency hopping window setting circuit (FHWINSET) 26, and collision display interface section 27.

In the transmission interface section 11, the transmission interface operation with respect to a station main body (not shown) such as a personal computer or work station is effected. Specifically, buffering, level conversion, timing adjustment, clock reproduction and clock synchronization for transmission data transferred from the station main body are effected.

In the S/P 12, transmission data received from the transmission interface section 11 is divided into three bit strings and the process of converting the speed of the divided three bit strings to a speed corresponding to the processing speed of coding.

Figure 7:
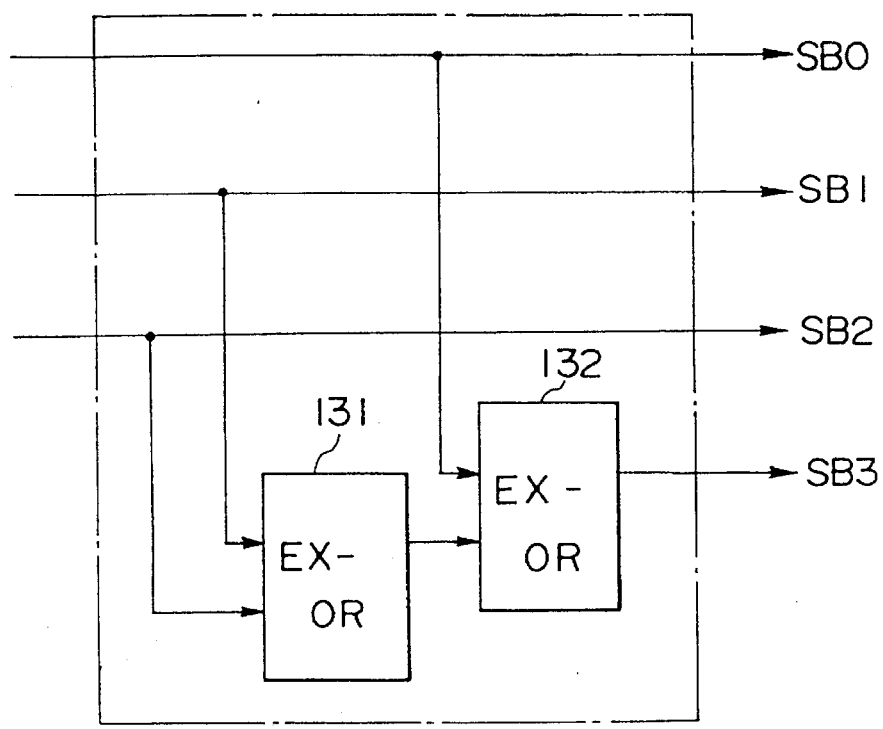
FIG. 7 is a circuit block diagram showing the concrete construction of a C1 encoder of the radio unit shown in FIG. 6.

In the C1 encoder (external encoder) 13, even when one or more bit strings are influenced by the frequency selectivity fading in a radio transmission period, a vertical block always including at least one bit of each bit string is coded to reproduce all of the bit strings from the bit strings received on the receiver side. For example, as the C1 code, a (4, 3, 2) parity check code is used. FIG. 7 shows a concrete example of a circuit of the C1 encoder 13. In this drawing, three bit strings SB0 to SB2 output from the S/P 12 are input for each bit to exclusive OR circuits 131, 132, and thus a parity check bit is derived out. Then, the derived parity check bit is output as a fourth bit string SB3 to the C2 encoder.

In the C2 encoders 140 to 143, error correction coding processes are effected for input bit strings SB0 to SB3 so as to add check bits. As the C2 code, a (21, 15, 4) enlarged humming code is used, for example.

Figure 8:
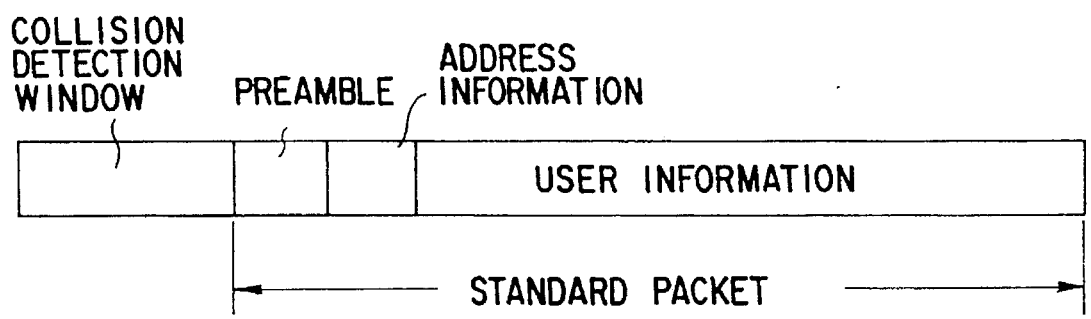
FIG. 8 is a diagram showing the configuration of a packet used in a radio LAN system according to the first embodiment of this invention.

In the collision detection circuit 15, a collision detection window is added to the head end of each of four bit strings output from the C2 encoders 140 to 143 as shown in FIG. 8. A plurality of random pulses are inserted into the collision detection window as shown in FIG. 3.

Figure 9:
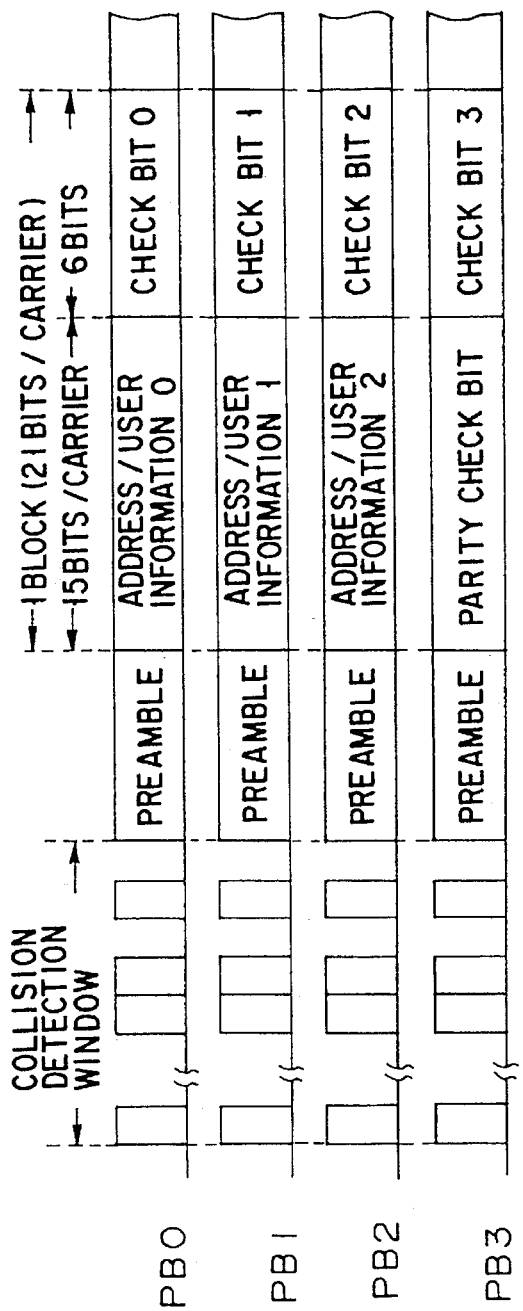
FIG. 9 is a diagram showing the configuration of a transmission string created by the radio unit shown in FIG. 6.

FIG. 9 shows concrete configurations of four bit strings PB0 to PB3 output from the collision detection circuit 15. In this drawing, address/user information items 0, 1, 2 of the bit strings PB0 to PB2 are obtained by dividing transmission data having a total number of 64 bytes at minimum to 1518 bytes at maximum and including an address of the transmission destination station, an address of the transmission source, packet-length data, LLC data, and frame check sequence (FCS) into three bit 10 strings for the carrier frequencies f0 to f2 by use of the S/P 12 and then dividing the bit strings into blocks for every 15 bits. Further, the parity check bit of the bit string PB3 is formed by arranging parity check bits of enlarged n bits (n=1 to 15) of the address/user information items 0 to 2 and created by the C1 encoder 13. The check bits 0 to 3 are check bits for enlarged humming code error correction added to the address/user information items for respective blocks and are created by the C2 encoders 140 to 143.

The modulators 160 to 163 modulate intermediate frequency signals by the bit strings PB0 to PB3 output from the collision detection circuit 15 by use of the QPSK system. The intermediate frequency signals are generated by the frequency synthesizer 20 to correspond to the carrier frequencies f0 to f3.

The transmission system of the RF section 17 includes four mixers, signal synthesizer, transmission power amplifier, and antenna multiplexer. In the respective mixers, modulated intermediate frequency signals output from the modulators 160 to 163 are mixed with local oscillation signals generated from the frequency synthesizer 20, thereby obtaining modulated carrier signals corresponding to four carrier frequencies f0 to f3. In the signal synthesizer, modulated carrier signals output from the mixers are combined with one another. In the transmission power amplifier, the modulated carrier signal output from the signal synthesizer is amplified to a preset transmission power level. The amplified modulated carrier signal is supplied to the antenna 18 via a circulator and transmitted by radio from the antenna 18.

The reception system of the RF section 17 includes a high frequency switch, high frequency amplifier and four mixers. The high frequency switch is kept in the OFF state in the transmission period and set in the ON state in the other period. In the high frequency amplifier, a received modulated carrier signal supplied via the high frequency switch is amplified to a preset level. In each of the mixers, the received modulated carrier signal is mixed with the local oscillation signal generated from the frequency synthesizer 20 and four reception intermediate frequency signals corresponding to the carrier frequencies f0 to f3 are output.

In the demodulators 190 to 193, the reception intermediate frequency signals output from the mixers are demodulated into reception bit strings of base band and clocks are reproduced from the reception bit strings. Further, in the demodulators 190 to 193, the signal levels of the reception intermediate frequency signals, a carrier detection signal is generated when the detected signal level is equal to or higher than a first reference level corresponding to a data signal, and a random pulse detection signal is generated when the detected level is equal to or higher than a second reference level corresponding to a random pulse for collision detection.

In the collision detection circuit 15, a collision detection pulse output from its own radio station is compared with random pulse detection signals output from the demodulators 190 to 193. In a case where a random pulse detection signal is received in a period in which its own radio station transmits no signal, it is determined that a collision occurs and a collision display signal is generated.

The C2 decoders 210 to 213 have a function of effecting the error correction decoding for the reception bit strings output from the demodulators 190 to 193 and a function of checking whether or not an error remains in the error correction decoded reception bit string. The bit strings RB0 to RB3 which are error-correction decoded by the C2 decoders 210 to 213 are input to the C1 decoder 22 together with the checking result indicating that an error remains or not.

In the C1 decoder 22, the process of restoring a bit error contained in a given bit string among the bit strings RB0 to RB3 based on a bit string which is normally received is effected. Then, the three-series reception bit strings restored in the C1 decoder 22 are input to the P/S 23. In the P/S 23, the three-series reception bit strings are converted into serial data and the converted serial data is transferred to the station main body which is not shown in the drawing as reception data via the reception interface 24.

Incidentally, a plurality of distribution stations STB connected to the distribution system DSM determine the common hopping timings (Ht0, Ht1, Ht2, Ht3, - - - in FIG. 5) by setting up the mutual synchronization. Then, preset hopping synchronization signals are generated before and after the hopping timings and transmitted to the respective user radio stations STU. The hopping synchronization signal contains information representing the hopping timing, information representing the hopping frequency, and information representing the radio zone BSA.

On the other hand, the user radio station STU receives a hopping synchronization signal transmitted from the distribution station STB in the frequency hopping synchronization detection/generation circuit (FH synchronization detection/generation circuit) 25 and recognizes the specified hopping timing and hopping frequency based on information contained in the hopping synchronization signal. Then, at the hopping timing specified by the hopping synchronization signal, a frequency control signal is supplied to the frequency synthesizer 20 to convert the four carrier frequencies f0 to f3 now in use into the specified hopping frequencies.

Further, the FH synchronization detection/generation circuit 25 has a self-generation function of hopping synchronization signal to cope with a case wherein the user radio station STU is used in a single radio zone BSA having no distribution station STB. The self-generation function is started when a hopping synchronization signal is not received even if reception of the hopping synchronization signal is monitored for a preset period of time, for example. Then, after the starting, transmission of a hopping synchronization signal to the other user radio station STU is started at a random timing. After this, transmission of the hopping synchronization signal is repeatedly effected in a preset hopping period (for example, 2 to 50 hopping/sec). Further, after the starting of the self-generation function, if a hopping synchronization signal is supplied from the other user radio station STU before transmitting a hopping synchronization signal, the FH synchronization detection/generation circuit 25 hereinafter effects the frequency hopping operation according to the hopping synchronization signal transmitted from the user radio station STU. Therefore, the hopping synchronizations between a plurality of user radio stations STU accommodated in the same radio zone BSA coincide with each other.

Further, each user radio station STU includes a frequency hopping window setting circuit (FH window setting circuit) 26. The FH window setting circuit 26 sets a frequency hopping window (FH window) in a preset period including the hopping timing so as to prevent the packet transmission period from overlapping the hopping operation period. A collision display signal is generated in the set period of the FH window and the signal is supplied to a station main body which is not shown in the drawing via the interface 27. The station main body interrupts transmission of the packet in a period in which the collision display signal is input.

Figure 10:
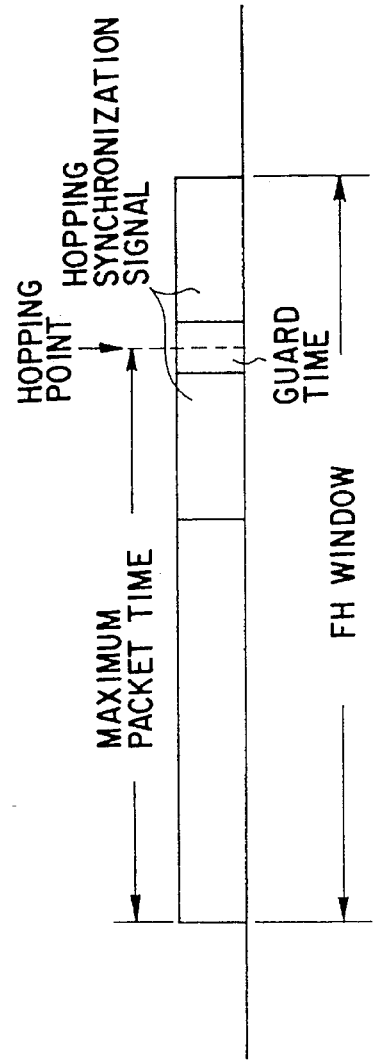
FIG. 10 is a diagram showing one example of the configuration of a frequency hopping window.

FIG. 10 shows an example of the construction of the FH window and the length of the front half portion thereof is set to be at least equal to or larger than a transmission period corresponding to the maximum packet length. Further, guard time is set to absorb time deviation of the transmission/reception timings caused by the propagation delay of the hopping synchronization signal by the radio circuit.

Next, the operation and effect of the radio LAN system (for example, FIG. 2A) of this embodiment is explained based on the above construction.

The user radio station STU effects the transmission and reception by simultaneously using four carrier frequencies f0 to f3 for the respective radio zones BSAa to BSAd as shown in FIG. 5. Therefore, if the user radio station STU attempts to transmit transmission data to another user radio station STU in the same radio zone in this state, the transmission data is divided into four-series bit strings which are subjected to the error correction coding and then transmitted in parallel by the above four carrier frequencies.

The frequency interval of the four carrier frequencies f0 to f3 is set to 10 MHz. The frequency interval is sufficiently larger than the width of the frequency selectivity fading (2 to 5 MHz). For this reason, even if frequency selectivity fading occurs, the number of carrier frequencies simultaneously receiving the influence may be one at most and the possibility that two or more of the four carrier frequencies are simultaneously influenced is low. Therefore, even if the frequency selectivity fading occurs, reception data can be accurately reproduced by effecting the error correction decoding process based on received bit strings of three carrier frequencies which are normally received in the station on the receiver side.

Further, in this embodiment, the following error correction system is used for error correction decoding. That is, in the transmission station, a bit string including a parity check bit is created based on three bit strings in the C1 encoder 13. In the C2 encoders 140 to 143, a check bit is added to each of the four bit strings. On the other hand, in the receiving station, one-bit error correction is effected based on the above check bit for each bit string in the C2 decoders 210 to 213. In a case where an error which cannot be corrected by the one-bit error correction is detected in a given bit string, an error correction decoding process for restoring a lost bit string based on the other bit string is effected by the C1 decoder 22 according to the result of detection by the C2 decoders 210 to 213. Therefore, even in a bad radio communication environment in which frequency selectivity fading tends to occur, a data error can be unfailingly corrected and reception data of high quality can be restored. For example, even if one of the four bit strings is made unreceivable by the influence of frequency selectivity fading, the provision temporarily defined in the IEEE802.11, radio LAN Standardization Committee, that is, the condition that the packet discarding ratio for packets of 512 octet length is not larger than $4.0 \times 10^{-5}$ can be satisfied in a case where the bit error rate of the other three bit strings is not larger than $2.8 \times 10^{-5}$.

Further, in this embodiment, if a code corresponding to the (43, 31) BCH code is used as an error correction code when information transmission speed is 10 Mbps, the physical transmission speed of the four bit strings becomes 10 Mbps $\times (43/31)/4 = 3.47$ Mbps. If the carrier is modulated by using the QPSK system or four-value FSK system, for example, based on the bit strings, one-symbol time of the bit string becomes 577 nsec. In this case, for example, the maximum display spread caused by multipath is approx. 270 nsec. As a result, the one-symbol time (577 nsec) of the bit string becomes sufficiently longer than the maximum display spread (270 nsec). Therefore, reception data can be accurately reproduced without receiving the influence of the multipath in the reception side station.

Further, in this embodiment, a hopping synchronization signal is transmitted in a preset period from the distribution stations STB to each user radio station STU for each of the radio zones BSAa to BSAd. For this reason, four carrier frequencies f0 to f3 used by each user radio station STU are simultaneously converted to different hopping frequencies specified by the hopping synchronization signal at the hopping timings Ht0, Ht1, Ht2, Ht3, - - - specified by the hopping synchronization signal for each of the radio zones BSAa to BSAd as shown in FIG. 5.

Therefore, even if violent frequency selectivity fading or multipath occurs in the radio transmission path and at least two of the four carrier frequencies are simultaneously made unreceivable by the influence thereof, the possibility that the influence by the fading or multipath can be avoided becomes high in a next period (20 to 500 msec) after the frequency is converted by hopping. Further, even if a device such as an electronic range which generates interfering waves is present near the position, it is possible to alleviate the influence of the interfering waves by the frequency hopping and effect the high-quality communication. In other words, this means that a radio LAN system can be constructed by use of frequency bands which are used by the electronic range and in which a large amount of various interfering waves are present.

Further, the hopping period of this embodiment is set to as long as 20 to 500 msec. Such a low-speed frequency hopping system does not require a wide band unlike the direct spread system. For this reason, it is suitable for suppressing the bandwidth used by the system. Therefore, the frequency bandwidth used by the system can be limited to a relatively narrow bandwidth of 40 MHz. For this reason, for example, a 2.4 GHz band which is a quasi-microwave band can be used. As a result, the transmission power of the radio unit can be reduced in comparison with a case wherein a higher frequency band such as a microwave band is used. Therefore, like a lap-top type and book type personal computer or work station, a user radio station can be easily constructed by using a device in which an electric power supplied to the radio unit is small.

Further, if the frequency hopping system is used, the frequency diversity effect can be obtained by the spectrum spread action thereof. For this reason, high-degree waveform equalization technique and multi-beam antenna can be made unnecessary. Therefore, an inexpensive radio station which attains reduction in the transmission power and which is small, lightweight and excellent in the portability can be constructed.

Further, in order to effect the frequency hopping, in each user radio station STU, an FH window shown in FIG. 10 is set in a period including the hopping timing and a hopping synchronization signal is received in the FH window. Therefore, there is no possibility that reception of the hopping synchronization signal collides with transmission of a transmission data packet, thereby making it possible to always stably effect the frequency hopping.

Further, information for identifying the radio zone BSA is contained in the hopping synchronization signal. For this reason, in each user radio station STU, whether a received hopping synchronization signal is for itself or not can be stably determined based on the identification information. Therefore, even in a user radio station lying near the boundary between a plurality of radio zones, for example, the precise frequency hopping can be always effected. Further, for example, a radio zone identifying switch is provided in the radio unit or specifying means for the radio zone by software is provided in the station main body. Then, specifying information of the radio zone input by the radio zone specifying means or by operation of the identifying switch may be collated with radio zone identifying information contained in the received hopping synchronization signal. As a result, the user radio station can be moved to a desired radio zone and used. Further, hopping synchronization signals transmitted from a plurality of distribution stations are received and a signal having the highest reception level is selected from the received hopping synchronization signals. Then, a radio zone corresponding to the selected hopping synchronization signal is selected and communication may be effected for the selected radio zone.

Further, in the FH synchronization detection/generation circuit 25, a function of independently generating and transmitting a hopping synchronization signal is provided. By using this function, the frequency hopping can be effected even in a system having no distribution station STB such as a system constructed by one radio zone BSA. Further, even in a case where the hopping signal transmitting function of the distribution station STB becomes defective, the frequency hopping can be continuously effected. As a result, the degree of equal distribution of the user radio stations can be enhanced.

Incidentally, in the radio LAN system, user radio stations accommodated in a common radio zone effect the radio communication by using the same carrier frequency. Therefore, if a plurality of user radio stations transmit data packets almost simultaneously, data collision will occur.

The system of this embodiment prevents occurrence of such data collision as follows. That is, in the user radio station STU, a collision detection window is set before the preamble of data in the collision detection circuit 15 and a preset number of pulses are transmitted at random intervals in the collision detection window. Whether pulses of a number larger than the preset number are present on the radio transmission path or not is checked based on the received signal by the collision detection circuit 15. If it is determined as the result of checking that pulses of a number larger than the preset number are present in the received signal, a collision display signal is generated and supplied to the station main body. For this reason, the station main body interrupts transmission of transmission data. Therefore, data collision on the radio transmission path can be unfailingly avoided.

Further, in a system which repeatedly uses the same carrier frequency in a plurality of radio zones, interference may occur between a plurality of radio zones if a means such as the radio shielding is not used. For example, in the system shown in FIG. 2B, a station which receives interference of worst interfering ratio (C/I) 6.5 dB lies in the two radio zones BSAb, BSAb. That is, in a case where each of the user radio stations accommodated in the two radio zones transmits data by using the same carrier frequency at substantially the same timing, a bit error due to the mutual interference of the transmission data may occur in a specified reception station even if data collision is not detected in the user radio station which has transmitted the data.

To cope with this, it is effective to take the following countermeasure. That is, first, the detection sensitivity of collision detection pulses of each of the user radio stations is adequately set. Then, if data is continuously received for a preset period of time or more in spite of detection of collision, a random pulse is transmitted as a collision occurrence informing signal for a preset period of time in the reception station. With this construction, information indicating that data collision occurs is transferred to each of the transmission stations. In each of the transmission stations which have received the collision occurrence information, a preset back-off process is effected and then the data retransmission process is effected. That is, in a system having the above collision occurrence informing means, it becomes unnecessary to separate a plurality of radio zones using the same frequency with a sufficiently large interference ratio or prepare a larger number of carrier frequencies.

(Second Embodiment)

This embodiment utilizes a multi-carrier chirp (MCCP) system and this system is applied to a radio LAN system (for example, FIG. 2A) having four radio zones BSAa to BSAd.

Figure 11:
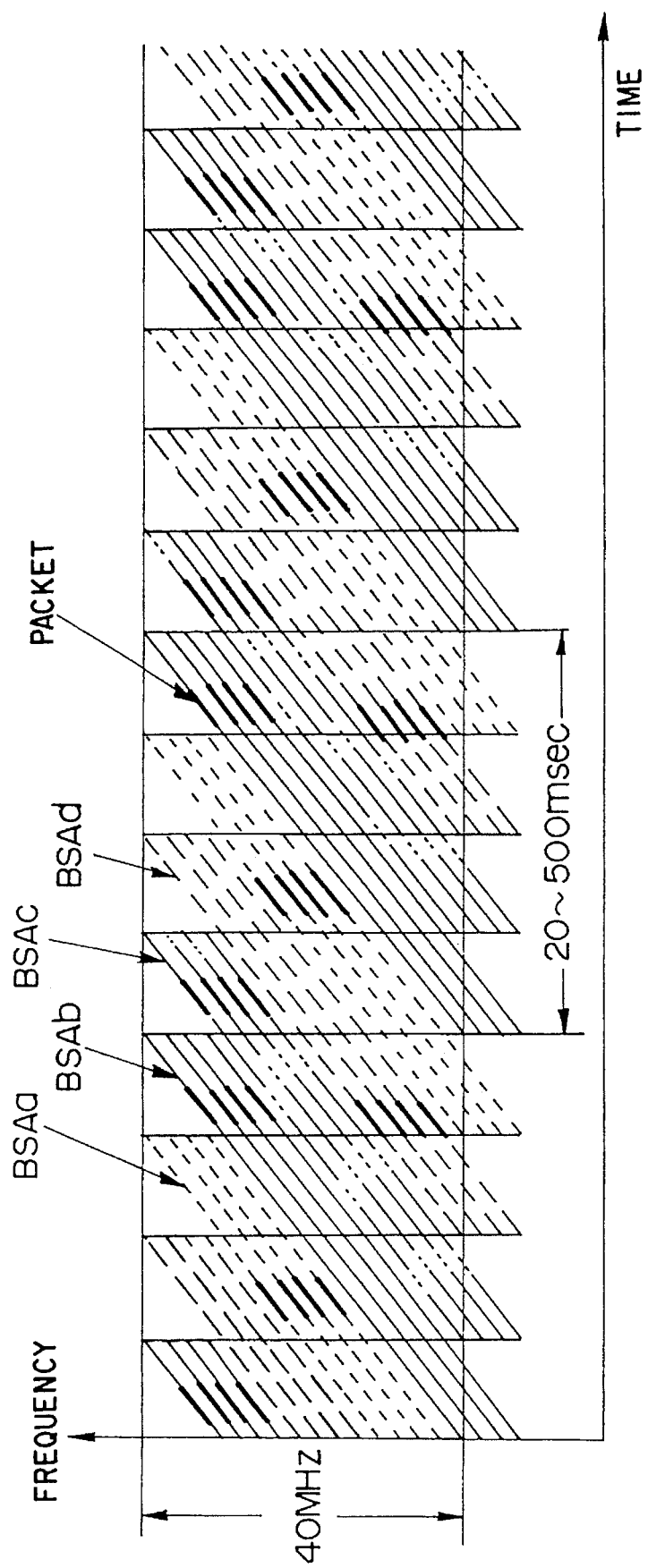
FIG. 11 is a diagram showing the arrangement and configuration of the carrier frequency by the multi-carrier chirp system according to a second embodiment of this invention.

FIG. 11 is a diagram showing the arrangement and configuration of carrier frequencies in the system of this embodiment. In the system of this embodiment, four carrier frequencies are allotted to each of the radio zones BSAa to BSAd. The frequency interval of the carrier frequencies is set to 2.5 MHz. Further, the frequency interval between the carrier frequencies allotted to the radio zones BSAa to BSAd is also set to 2.5 MHz. Therefore, the carrier frequencies of 16 waves in total are all arranged at the frequency interval of 2.5 MHz in the entire system. Further, in the system of this embodiment, the carrier frequencies of the 16 waves are repeatedly swept with the sweeping width of 40 MHz, for example, in a period of 20 to 500 msec. The frequency bandwidth used by the system is 50 MHz.

Figure 12:
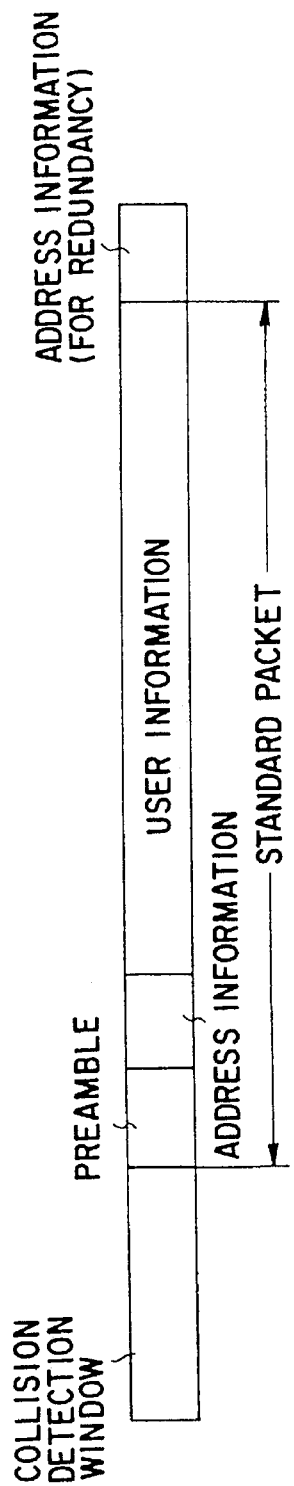
FIG. 12 is a diagram showing the configuration of a packet transmitted by use of the multi-carrier chirp system according to the second embodiment of this invention.

FIG. 12 shows an example of the configuration of a data packet transmitted by the user radio station STU. A standard packet is constructed by a preamble, first address information, and user information. A collision detection window is added to the front portion of the preamble. Further, second address information is added to the rear portion of the user information. The reason why the second address information is added is to transmit address information at different carrier frequencies in a redundant fashion.

Further, in the system of this embodiment, the sweeping operation of the carrier frequency in the respective radio zones BSAa to BSAd is controlled as follows. That is, distribution stations STB in the respective radio zones BSAa to BSAd define the common sweep switching timing by setting up the mutual synchronization via a distribution system DSM. Then, a preset sweep synchronization signal is generated before and after the sweep switching timing for each sweep switching timing and transmitted to the user radio stations STU in the radio zones. The sweep synchronization signal includes information indicating the sweep switching timing, information indicating the sweep phase and information indicating the radio zone BSA.

On the other hand, each of the user radio stations STU includes a sweep synchronization detection/generation circuit. The sweep synchronization detection/generation circuit receives a sweep synchronization signal transmitted from the distribution station STB and a specified sweep switching timing and sweep phase are recognized based on information contained in the sweep synchronization signal. In a sweep period from the sweep switching timing specified by the sweep synchronization signal to the next sweep switching timing, a frequency control signal is supplied to a frequency synthesizer to sweep four carrier frequencies now in use according to a preset frequency variation rate.

Further, the sweep synchronization detection/generation circuit has a self-generation function of sweep synchronization signal to cope with a case where the user radio station STU is used in a single radio zone BSA having no distribution station STB. For example, the self-generation function is started when a sweep synchronization signal is not received even if reception of the sweep synchronization signal is monitored for a preset period of time. Then, after the starting, transmission of the sweep synchronization signal to another user radio station STU is started at a random timing. After this, the transmission of the sweep synchronization signal is repeatedly effected in a preset sweep period (for example, 20 to 500 msec).

Further, the user radio station STU has a frequency sweep window setting circuit (chirp window setting circuit). The chirp window setting circuit sets the frequency sweep window (chirp window) containing sweep switching timings in a preset period to prevent the packet transmission period from overlapping the reception period of the sweep synchronization signal. Then, a collision display signal is generated in the chirp window setting period and the signal is supplied to the station main body via the interface. The station main body interrupts the packet transmission in a period in which the sweep synchronization signal is input.

Figure 13:
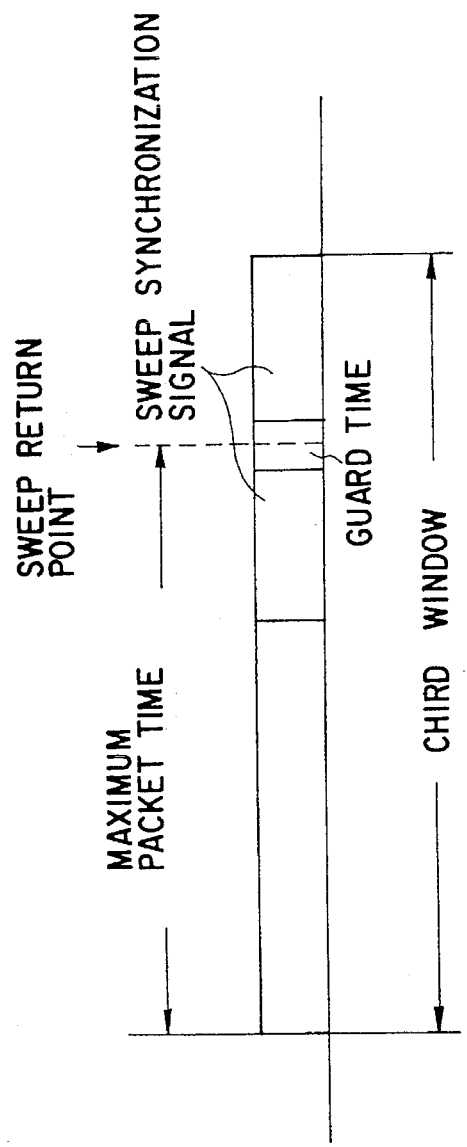
FIG. 13 is a diagram showing one example of the configuration of a chirp window.

FIG. 13 shows an example of the configuration of the chirp window and the length of the front half portion thereof is set to be longer than at least the transmission period corresponding to the maximum packet length. Further, guard time is set to absorb deviation in the transmission/reception timing due to the propagation delay of the sweep synchronization signal by the radio circuit.

Since the other portion of the radio unit of this embodiment has the same construction as that of the first embodiment, the explanation thereof is omitted.

Thus, with the system of this embodiment using the multi-carrier chirp system, four carrier frequencies used by the user radio stations STU are repeatedly swept with the seep width of 40 MHz in a period of 20 to 500 msec. For this reason, even if frequency selectivity fading occurs, time by which the influence thereof is given to a given carrier frequency is limited to extremely short time. Therefore, the influence of the frequency selectivity fading is suppressed.

Further, even when an interfering wave generation source such as an electronic range is present near the position, the influence of the interfering wave is limited to extremely short time. In other words, even in the frequency band used by the interfering wave generation source such as an electronic range, high-quality radio communication can be effected without causing a serious problem. Further, when interfering waves from the electronic range or the like are detected, it is possible to set a window for inhibiting data packet transmission in the frequency band of the interfering waves. This makes it possible to substantially completely eliminate the influence of the interfering wave, thereby attaining the high-quality radio communication.

Further, like the first embodiment, data which is divided into four bit strings is transmitted. For this reason, one-symbol time of each bit string is set sufficiently longer than the maximum display spread due to the multipath. Therefore, in the station on the reception side, reception data can be accurately reproduced without receiving the influence of the multipath.

Further, in this embodiment, the frequency sweep is effected at a low speed. The low-speed chirp system does not require a wide band unlike the direct spread system. For this reason, it is suitable for suppression of the bandwidth used by the system. Therefore, the frequency bandwidth used by the system can be limited to 50 MHz. For this reason, for example, it becomes possible to use a 2.4 GHz band which is a quasi-microwave band. As a result, the transmission power of the radio unit can be reduced in comparison with a case wherein a higher frequency band such as a microwave band is used. Therefore, even if a device in which an electric power which can be transmitted to the radio unit is small like a lap-top type or book type personal computer or work station is used, a user radio station can be easily constructed.

Further, when the chirp system is used, the frequency diversity effect by the spread spectrum action can be obtained. For this reason, it becomes possible to omit the high-quality wave equalization technique and multi-beam antenna. Therefore, an inexpensive radio station in which an effect of reducing the transmission power is obtained and which is small and lightweight and excellent in the portability can be easily constructed.

Further, since address information is transmitted not only in the standard packet but also in the rear portion of the standard packet, address information can be transmitted by different frequencies in a redundant fashion. For this reason, even if a large number of bit errors which cannot be restored to user information occur by the influence of frequency selectivity fading or multipath, at least the address information can be accurately received and reproduced by the reception station. Therefore, in this case, it is possible to make a re-transmission request to the transmission station in the low-order layer without relying on control of the high-order layer. For this reason, significant deterioration in the throughput of the entire system can be prevented.

In each of the above embodiments, a case wherein the multi-carrier hopping system or multi-carrier chirp system is used is explained, but the following modification and application can be made. That is, as the spread spectrum system, the direct spread system or high-speed frequency hopping system can be used. Further, in the first embodiment, after each of a plurality of bit strings is subjected to the primary modulation by the QPSK system or the like, the secondary modulation is effected by the spread spectrum system. However, it is possible to effect the secondary modulation by the QPSK system or the like after each of the bit strings is subjected to the primary modulation by the direct spread system.

Further, in the first embodiment, when a violent random or burst error occurs in bit strings of a plurality of carrier frequencies, data is re-transmitted in the next hopping period. However, with this system, significant deterioration in the throughput occurs in a specified user radio station. Further, the violent random or burst error in one carrier frequency may not be completely corrected according to the type of the selected error correction code.

As the countermeasure, the following measure can be considered, for example. That is, information of the carrier frequency causing a burst error or the carrier frequency at which data can be correctly received is given from the reception station to the transmission station. Then, in the transmission station, the normal carrier frequency or another available carrier frequency is selected or the error correction code is strengthened according to the received information and data is retransmitted. By doing this, deterioration in the throughput in the specified station can be suppressed. Further, in a case where a plurality of packets are transmitted between the same user radio stations in the same hopping period, transmission of data using only the normal carrier frequency or transmission of data having an error correction code strengthened is continuously effected and the transmission is released in the next and succeeding hopping periods. This makes it possible to prevent occurrence of a problem that temporary deterioration in the throughput will continue.

Further, in the first and second embodiments, a case wherein the bandwidth used by the system is set to 40 MHz or 50 MHz under the condition of the quasi-microwave band was explained as an example. However, it becomes possible to use a wide band of 70 MHz or 140 MHz or the like as the bandwidth as the IEEE802 Standardization Committee appeals to the frequency authorization organization of each country, a large-scale radio LAN system having a larger number of radio zones and capable of effecting the radio communication without causing mutual interference can be constructed.

Further, in each of the above embodiments, a case wherein the number of carrier frequencies which can be used in one radio zone is set to four was explained. However, if a wider bandwidth can be attained, the number of carrier frequencies which can be used in one radio zone may be set to five or more. This makes it possible to reduce the rate of carrier frequencies at which communication is made impossible by the frequency selectivity fading or multipath. As a result, the error correction code can be simplified and the data transmission speed can be enhanced.

Further, in the former embodiment, a system in which the equal spread system and CSMA/CD system are used and the transmission speed of base band data is set to 10 Mbps was explained as an example. However, a centralization system, a tone passing system, or a system which effects the high-speed transmission by use of quite different access protocol, or a system for transmitting information such as a speech or mobile image which is not always necessary to be transmitted in a packet form may be used.

(Third Embodiment)

In this embodiment, transmission data is divided into six bit strings, and even if the communication of two bit strings among the six bit strings becomes impossible when the six bit strings are transmitted in parallel by use of six different carrier frequencies, received data can be restored.

Figure 14:
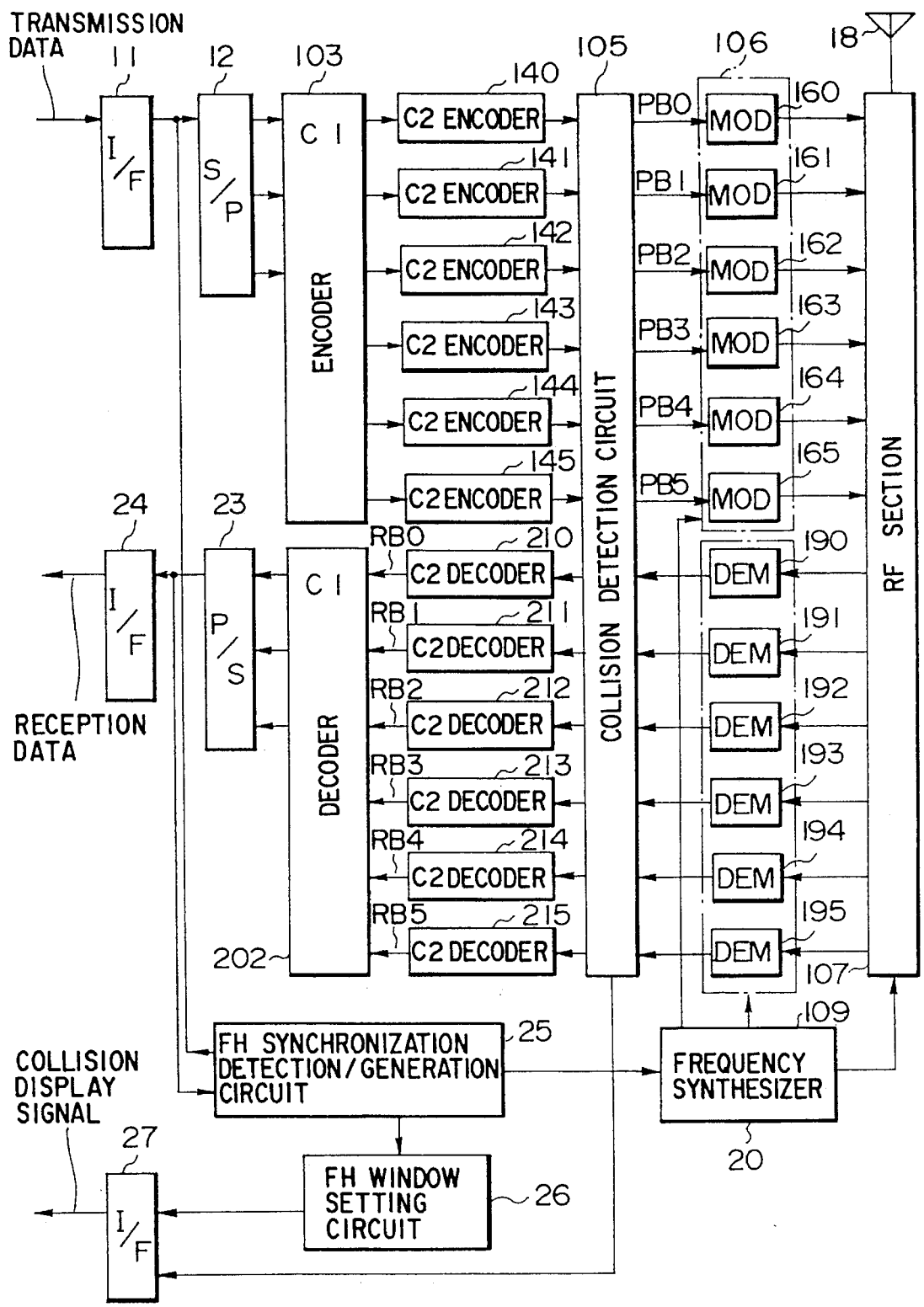
FIG. 14 is a circuit block diagram showing the construction of a radio unit of a user radio station according to a third embodiment of this invention.

FIG. 14 is a circuit block diagram showing the construction of a radio unit of a user radio station according to this embodiment. In this diagram, the same reference numerals are attached to portions which are the same as those of FIG. 6 and the detail explanation therefor is omitted.

In a C1 encoder 103, error correction coding is effected for three bit strings output from an S/P 12 by use of a (6, 3, 3) humming code, thereby outputting six bit strings. The process delay time caused by the coding and decoding process when the (6, 3, 3,) humming code is used is approximately equal to the frame length or three bit times. Six bit strings output from the C1 encoder 103 are respectively input to C2 encoders 140 to 145. In the C2 encoders 140 to 145, check bits are added to the six bit strings. Bit strings output from the C2 encoders 140 to 145 are input to a collision detection circuit 105. In the collision detection circuit 105, a collision detection window is added to each of the bit strings. Then, the bit strings PB0 to PB5 to which the collision detection windows are added are input to modulators 160 to 165 to modulate intermediate frequency signals corresponding to carrier frequencies f0 to f5.

Figure 15:
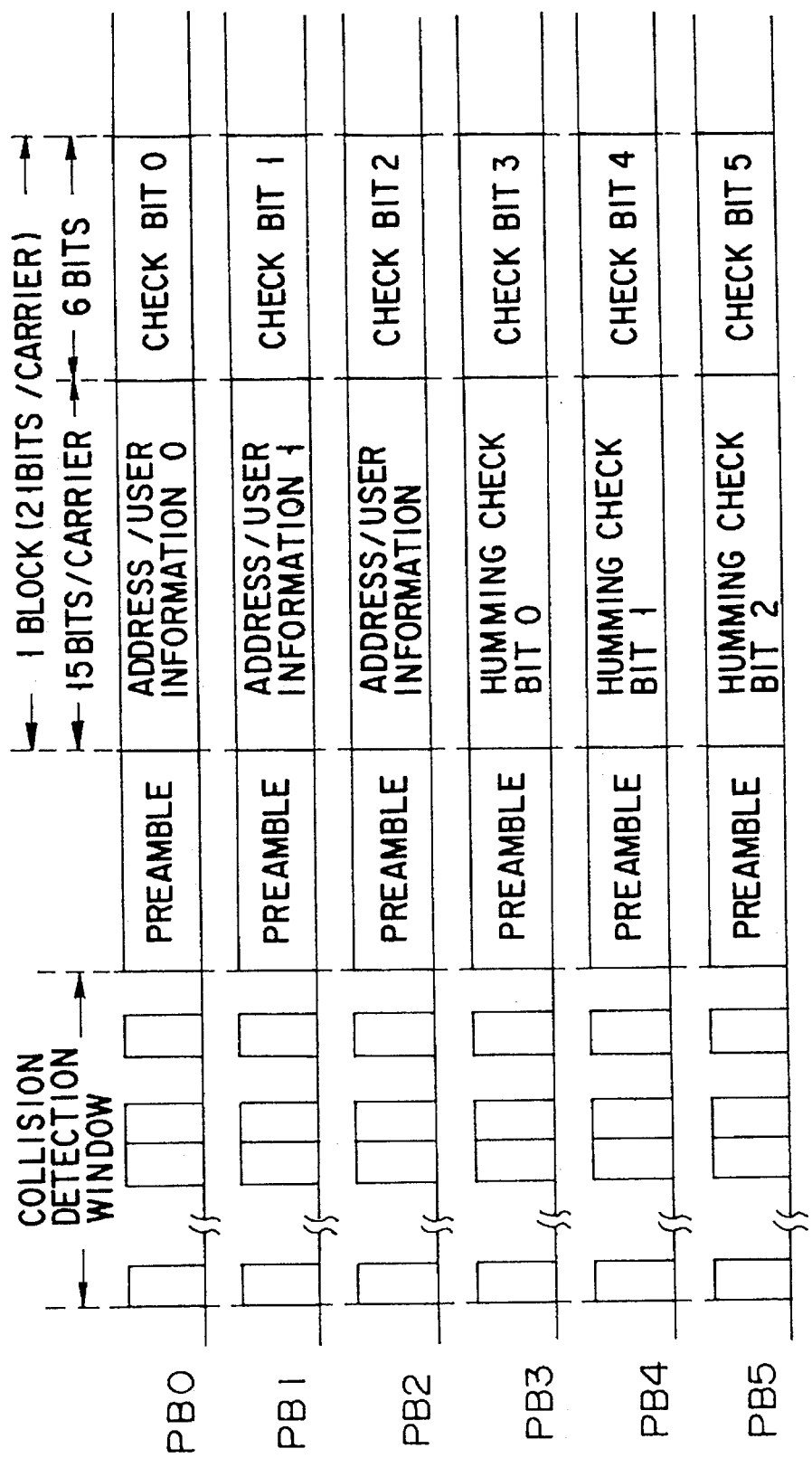
FIG. 15 is a diagram showing the configuration of a transmission bit string created by the radio unit shown in FIG. 14.

FIG. 15 shows the configuration of the bit strings PB0 to PB5 output from the collision detection circuit 105. Address/user information items 0 to 2 of the bit strings PB0 to PB2 are obtained by dividing transmission data having a total number of 64 bytes at minimum to 1518 bytes at maximum and including an address of the transmission destination station, an address of the transmission source station, packet length data, LLC data, and frame check sequence (FCS) into three bit strings according to the carrier frequencies f0 to f2 by the S/P 12 and then dividing the bit strings into blocks for every 15 bits. Humming check bits 0 to 2 are obtained by arranging check bits (three bits) of the (6, 3, 3) humming code of an n-th bit (n=1 to 15) of the address/user information items 0 to 2 and are created in the C1 encoder 103. The check bits 0 to 2 are error correction check bits of a (21, 15, 4) enlarged humming code to which the address/user information items 0 to 2 are subjected and are created in the C2 encoders 140 to 142. Further, the check bits 3 to 5 are error correction check bits of a (21, 15, 4) enlarged humming code to which the humming check bits 0 to 2 are subjected and are created in the C2 encoders 143 to 145.

On the other hand, six bit strings of base band demodulated by demodulators 190 to 195 are input to C2 decoders 210 to 215 via the collision detection circuit 105. In the C2 decoders 210 to 215, error correction decoding for the above received bit strings and determination whether or not an error remains in the received bit strings subjected to the error correction decoding are effected. Then, the received bit strings RB0 to RB5 subjected to the error correction decoding by the C2 decoders 210 to 215 are input to the C1 decoder 202 together with the result of determination whether the error remains or not.

In the C1 decoder 202, a process of restoring a bit error contained in a given bit string among the bit strings RB0 to RB5 based on the normally received bit strings. Then, three-series received bit strings restored by the C1 decoder 22 are input to the P/S 23. In the P/S 23, the three-series received bit strings are converted into serial data and the converted serial data is transferred as reception data to a station main body which is not shown in the drawing via the reception interface 24.

Thus, in the radio station of this embodiment, three bit strings containing humming check bits are created by using a (6, 3, 3) humming code for three bit strings containing address/user information in the C1 encoder 103. Then, check bits are added to the respective six bit strings in the C2 encoders 140 to 145 and transmitted. For this reason, in the reception station, even if bit errors which cannot be corrected in the C2 encoders 140 to 145 occur in two bit strings among the six received bit strings, the two bit strings can be restored in the C1 decoder 202 and reception data can be reproduced.

(Fourth Embodiment)

In the radio unit of the first embodiment, the error correction coding was effected by using a (21, 15, 4) enlarged humming code for each bit string in the C2 encoders 140 to 143. However, in a case where the QPSK system is used as the modulation system, there is a possibility that an error simultaneously occurs in one symbol, that is, two bits.

In this embodiment, four-series bit strings output from a C1 encoder are each divided into two series to correct such a two-bit error. Then, the encoding is effected for the two-series bit strings by use of a (21, 15, 4) enlarged humming code and the two-series bit strings are transmitted as an I-axis component and Q-axis component of the QPSK.

Figure 17:
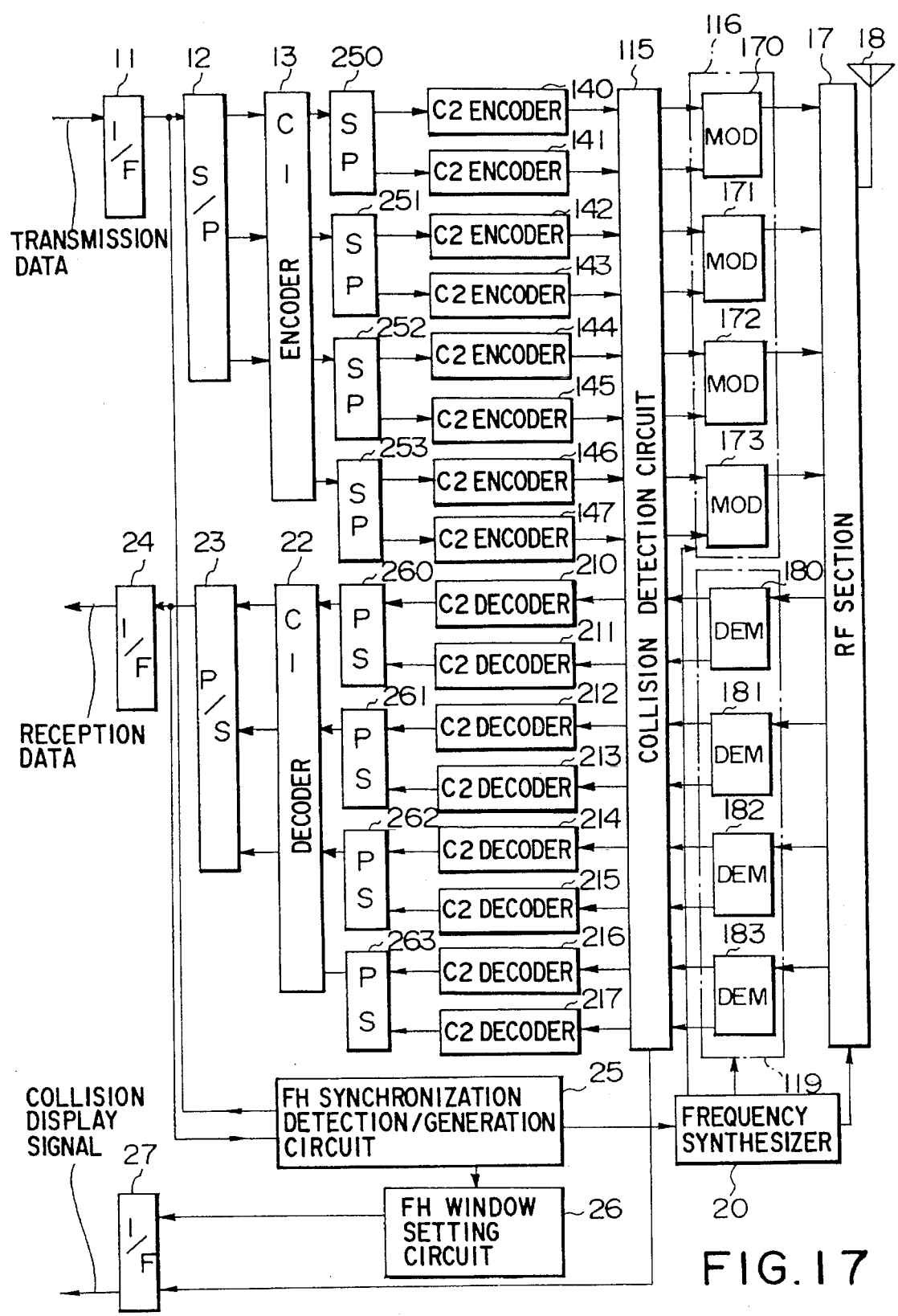
FIG. 17 is a circuit block diagram showing the construction of a radio unit of a user radio station according to a fourth embodiment of this invention.

FIG. 17 is a circuit block diagram showing the construction of a radio unit for realizing such an error code coding/decoding system. In the drawing, four-series bit strings output from the C1 encoder 13 are input to S/Ps 250 to 253. In the S/Ps 250 to 253, each bit string is divided into two series. Eight-series bit strings output from the S/Ps 250 to 253 are input to the C2 encoders 140 to 147. In the C2 encoders 140 to 147, input bit strings are coded by the (21, 15, 4) humming code. Bit strings output from the C2 encoders 140 to 147 are input to modulators 170 to 173 via a collision detection circuit 115. In the modulators 170 to 173, two bit strings divided by each of the S/Ps 250 to 253 are subjected to the QPSK modulation as the I-axis component and Q-axis component.

On the other hand, the respective bit strings of the I-axis component and Q-axis component obtained by the QPSK demodulation in the demodulators 180 to 183 are input to C2 decoders 210 to 217 via a collision detection circuit 115. In the C2 decoders 210 to 217, the error correction decoding for the received bit strings and determination whether or not an error remains in the received bit strings subjected to the error correction decoding are effected. Then, the received bit strings subjected to the error correction decoding by the C2 decoders 210 to 217 are input to P/Ss 260 to 263 with the I-axis component and Q-axis component set as one pair. In the P/Ss 260 to 263, the bit string of the I-axis component and the bit string of the Q-axis component are combined into one-series received bit string. Four-series received bit strings output from the P/Ss 260 to 263 are input to a C1 decoder 22. In the C1 decoder 22, the process of restoring a bit error contained in a given bit string among the above bit strings based on normally received bit strings is effected. Then, three-series bit strings restored in the C1 decoder 22 are input to a P/S 23. In the P/S 23, the above three-series received bit strings are converted into serial data and the converted serial data is transferred as reception data to a station main body which is not shown in the drawing via a reception interface 24.

Thus, in the radio station of this embodiment, four-series bit strings output from the C1 encoder 13 are 10 divided into the bit string of I-axis component and the bit string of Q-axis component in the respective S/Ps 250 to 253. Then, the enlarged humming coding is individually effected for the bit strings in the C2 encoders 140 to 147 and the QPSK modulation is effected based on the bit strings of I-axis component and Q-axis component in the modulators 170 to 173. Therefore, even if one symbol, that is, two-bit error occurs, the two-bit error can be corrected without fail by using the QPSK system. Further, this embodiment has an advantage that correction of the two-bit error can be realized without changing parameters such as coding rate.

In addition, an error correction coding/decoding system can be variously modified as follows.

Figure 16:
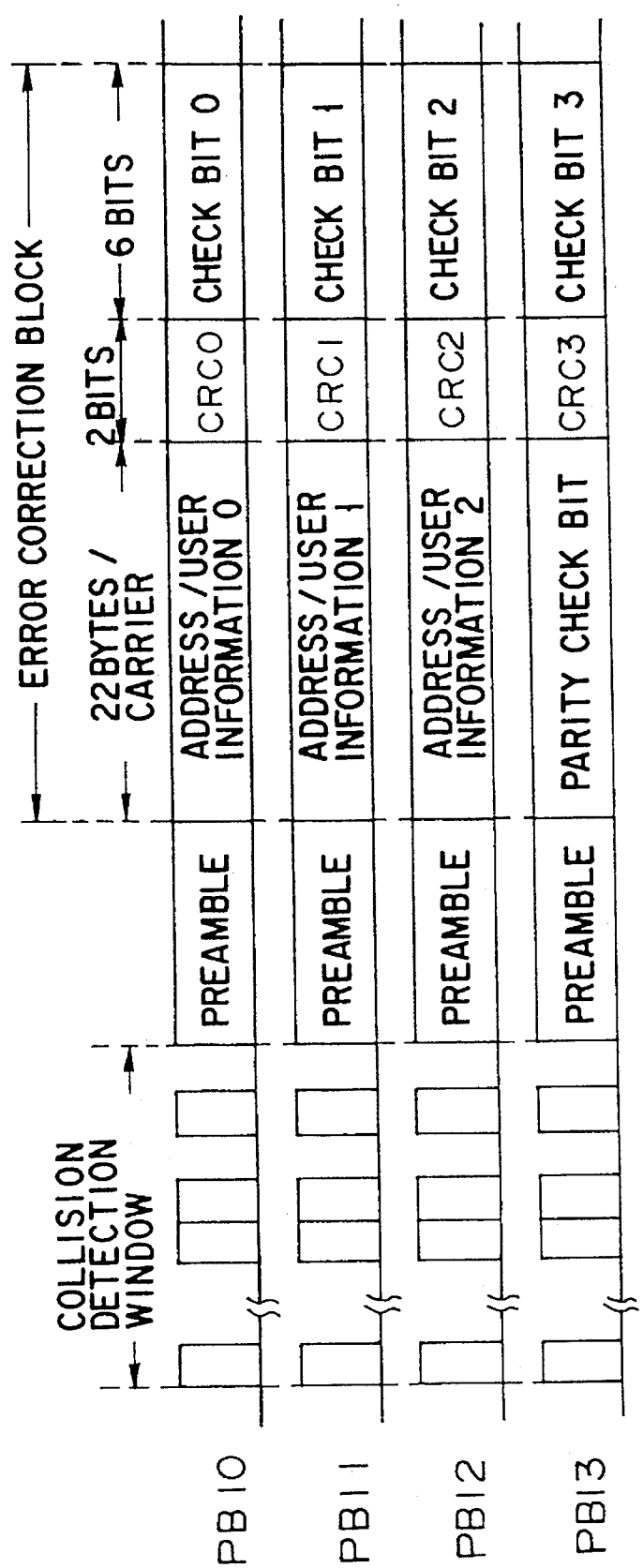
FIG. 16 is a diagram showing an example of the configuration of four bit strings output from a collision detection circuit when an RS code and CRC check code are used as an error correction code.

That is, it is possible to use a (30, 24, 7) RS code and 16-bit CRC check code as an error correction code used in the C2 encoder. FIG. 16 shows the configuration of four bit strings output at this time from the collision detection circuit 115. In the drawing, the parity check bit is obtained by arranging an n-th (n=1 to 176) parity of address/user information items 0 to 2 and created in the C1 encoder. $CRC_i$ (i=0, 1, 2) is an error detection bit of the address/user information item i, CRC3 is an error correction detection bit of the parity check bit, and they are both attached in the C2 encoder. Further, the check bit i (i=0, 1, 2) is the address/user information item i and the error correction check bit of $CRC_i$, the check bit 3 is a parity check bit and the error correction check bit of CRC3, and they are attached by the C2 encoder like the CRC.

If such an error correction code is used, the shortest packet (512 bits) of IEEE802.3 is divided into one block for every carrier frequency, that is, four blocks in total. Then, for each block or for each carrier, an error up to three bytes can be corrected. Further, even if an error exceeds three bytes for each block and the error cannot be corrected by the C2 decoder or erroneously corrected, the error is detected by the CRC and information thereof is given to the C1 decoder.

Therefore, by using the above error correction code, the packet discarding ratio (less than $4.0 \times 10^{-5}$ for a packet of 512 octet length) required by IEEE802.11 even in a bad environment in which communication for one bit string among the four bit strings becomes impossible by the influence of frequency selectivity fading or the like or an error thereof becomes equal to or more than four bits and the error rate of the other three bit strings becomes $3.2 \times 10^{-4}$.

Further, in an example of FIG. 16, an RS code may be used instead of the CRC. This makes it possible to slightly enhance the coding rate since the CRC check bit becomes unnecessary, thereby permitting a necessary frequency band to be slightly narrowed.

Further, a convolutional code can be used as the error correction code used in the C2 encoder. For example, if a convolutional code whose coding rate is ¾ is used, the coding rate becomes substantially the same as that described in the first embodiment. When the Viterbi coding is effected by using the convolutional code in the reception station, the error correction ability can be further enhanced since a value derived by calculating the result of C1 decoding for a survival path can be incorporated into the path-metric calculation.

Further, it is possible to use an error correction code such as an (8, 6, 3) RS code in which the loss correction for ¼ of the code length can be made as the error correction code used in the C1 encoder. In this case, in the C1 decoder of the reception station, all of the four bit strings can be restored by determining a lost bit by a communication impossible signal output from the demodulator or an error correction code output from the C2 decoder and effecting the lost correction by decoding the RS code. The complexity of the calculation for the RS code is theoretically proportional to the square of the minimum distance. For this reason, with an RS code having a low correction ability that the minimum distance is set to approx. 3, it becomes possible to suppress the process delay time of the coding and decoding to a period of time corresponding to the block length, that is, 8 bytes by developing an exclusive-use LSI.

Further, in the first embodiment, a case where reception data can be restored when one bit string among the four bit strings becomes unreceivable was explained. In addition, the error correction encoder/decoder can be constructed so as to restore reception data when one bit string among two, three, five or more bit strings becomes unreceivable.

Figure 18:
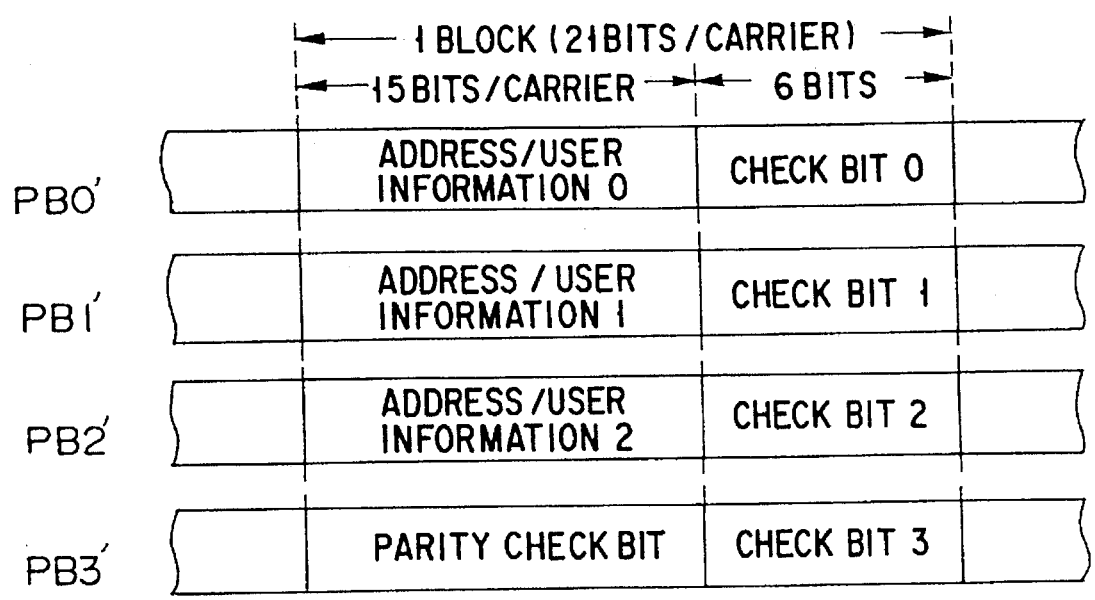
FIG. 18 is a diagram showing the configuration of a transmission bit string obtained when this invention is applied to a circuit switching system.

Further, in each of the above embodiments, cases where the packet communication is effected were explained, but this invention can be applied to a system for circuit switching. Specifically, for example, transmission data is divided for every 45 bits to form blocks as shown in FIG. 18 and the block is transferred as one unit.

We claim:

1. A radio information communication system for transmitting data between a plurality of radio stations via a radio transmission path, characterized in that;

said radio station comprises:

dividing means for dividing at least part of a transmission data string into a plurality of bit strings and outputting the same;

primary modulation means for performing (primary modulation on) a plurality of first carrier signals of different frequencies based on the plurality of bit strings output from said dividing means;

secondary modulation means having receiving means for receiving a hopping synchronization signal periodically transmitted from another radio station and containing information representing at least the hopping timing, for performing (secondary modulation on) the plurality of first carrier signals modulated by said primary modulation means by a frequency hopping system according to the hopping synchronization signal received by said receiving means and outputting a plurality of second carrier signals performed to the secondary modulation;

transmission means for transmitting the plurality of second carrier signals output from said secondary modulation means to said radio transmission path in parallel; and hopping window setting means for setting a frequency hopping window in a preset period including a reception period of the hopping synchronization signal and the hopping timing and interrupting transmission of the second carrier signal in a period in which said frequency hopping window is set.

2. A radio information communication system for transmitting data between a plurality of radio stations via a radio transmission path, characterized in that;

said radio station comprises:

dividing means for dividing at least part of a transmission data string into a plurality of bit strings and outputting the same;

primary modulation means for performing (primary modulation on) a plurality of first carrier signals of different frequencies based on the plurality of bit strings output from said dividing means;

secondary modulation means having receiving means for receiving a sweep synchronization signal periodically transmitted from another radio station and containing information representing at least the sweep switching timing, for performing (secondary modulation on) the plurality of first carrier signals modulated by said primary modulation means by a chirp system according to the sweep synchronization signal received by said receiving means and outputting a plurality of second carrier signals performed to the secondary modulation; and transmission means for transmitting the plurality of second carrier signals output from said secondary modulation means to said radio transmission path in parallel.

3. A radio information communication system for transmitting data between a plurality of radio stations via a radio transmission path, characterized in that;

said radio station comprises:

dividing means for dividing at least part of a transmission data string into a plurality of bit strings and outputting the same;

primary modulation means for performing (primary modulation on) a plurality of first carrier signals of different frequencies based on the plurality of bit strings output from said dividing means;

secondary modulation means having receiving means for receiving a sweep synchronization signal periodically transmitted from another radio station and containing information representing at least the sweep switching timing, for performing (secondary modulation) on the plurality of first carrier signals modulated by said primary modulation means by a chirp system according to the sweep synchronization signal received by said receiving means and outputting a plurality of second carrier signals performed to the secondary modulation; and transmission means for transmitting the plurality of second carrier signals output from said secondary modulation means to said radio transmission path in parallel; and means for independently and periodically generating and transmitting a sweep synchronization signal when the sweep synchronization signal is not received by said receiving means for a preset consecutive period of time.

4. A radio information communication system for transmitting data between a plurality of radio stations via a radio transmission path, characterized in that;

said radio station comprises:

dividing means for dividing at least part of a transmission data string into a plurality of bit strings and outputting the same;

primary modulation means for performing (primary modulation on) a plurality of first carrier signals of different frequencies based on the plurality of bit strings output from said dividing means;

secondary modulation means having receiving means for receiving a sweep synchronization signal periodically transmitted from another radio station and containing information representing at least the sweep switching timing, for performed (secondary modulation on) the plurality of first carrier signals modulated by said primary modulation means by a chirp system according to the sweep synchronization signal received by said receiving means and outputting a plurality of second carrier signals performed to the secondary modulation; and transmission means for transmitting the plurality of second carrier signals output from said secondary modulation means to said radio transmission path in parallel; and chirp window setting means for setting a chirp window in a preset period including a reception period of the sweep synchronization signal and the sweep switching timing and interrupting transmission of the second carrier signal in a period in which said chirp window is set.

5. A radio information communication system for transmitting data between a plurality of radio stations via a radio transmission path, characterized in that;

said radio station comprises:

dividing means for dividing at least part of a transmission data string into a plurality of bit strings and outputting the same;

address inserting means for inserting the entire information of at least address information among the transmission data string into the plurality of bit strings output from said dividing means;

primary modulation means for performing (primary modulation on) a plurality of first carrier signals of different frequencies based on the plurality of bit strings into which the entire information of the address information is inserted by said address inserting means;

secondary modulation means for performing (secondary modulation on) the plurality of first carrier signals modulated by said primary modulation means by a spread spectrum system and outputting a plurality of second carrier signals; and transmission means for transmitting the plurality of second carrier signals output from said secondary modulation means to said radio transmission path in parallel.

6. A radio information communication system for transmitting data between a plurality of radio stations via a radio transmission path, characterized in that;

said radio station comprises:

dividing means for dividing at least part of a transmission data string into a plurality of bit strings and outputting the same;

address inserting means for inserting at least address information of the transmission data string into a plurality of portions of at least one bit string output from said dividing means;

primary modulation means for performing (primary modulation on) a plurality of first carrier signals of different frequencies based on said plurality of bit strings including said bit string into which the address information is inserted by said address inserting means;

secondary modulation means for performing (secondary modulation on) the plurality of first carrier signals modulated by said primary modulation means by a spread spectrum system and outputting a plurality of second carrier signals; and transmission means for transmitting the plurality of second carrier signals output from said secondary modulation means to said radio transmission path in parallel.

7. A radio information communication system for transmitting data between a plurality of radio stations via a radio transmission path, characterized in that;

said radio station comprises:

dividing means for dividing at least part of a transmission data string into a plurality of bit strings and outputting the same;

error correction signal creating means for creating and outputting a new bit string containing an error correction signal based on at least one bit string among the plurality of bit strings output from said dividing means;

error detection signal adding means for adding error detection signals to the new bit string containing the error correction signal output from said error correction signal creating means and the plurality of bit strings output from said dividing means and outputting them;

primary modulation means for performing (primary modulation on) a plurality of first carrier signals of different frequencies based on the plurality of bit strings output from said error detection signal adding means;

secondary modulation means for performing (secondary modulation on) the plurality of first carrier signals modulated by said primary modulation means by a spread spectrum system and outputting a plurality of second carrier signals;

transmission means for transmitting the plurality of second carrier signals output from said secondary modulation means to said radio transmission path in parallel;

receiving means for receiving the plurality of second carrier signals of different frequencies transmitted from another radio station via said radio transmission path;

secondary demodulation means for performing (secondary demodulation on) the plurality of second carrier signals received by said receiving means in synchronism with the secondary modulating operation by said secondary modulation means of said another radio station and outputting the plurality of first carrier signals;

primary demodulation means for performing (primary demodulation on) the plurality of first carrier signals output from said secondary demodulation means and outputting a plurality of reception bit strings of base band;

error detection means for detecting a bit error based on an error detection signal contained in the reception bit string for each of the plurality of reception bit strings output from said primary demodulation means;

error correction means for correcting an error of the bit string in which the bit error is detected by said error detection means based on a bit string among said plurality of reception bit strings which contains an error correction signal and then outputting the same; and synthesizing means for combining together the plurality of reception bit strings output from said error correction means to reproduce the received data string.

8. A radio information communication system for transmitting data between a plurality of radio stations via a radio transmission path, characterized in that;

said radio station comprises:

dividing means for dividing at least part of a transmission data string into a plurality of bit strings and outputting the same;

first error correction signal creating means for creating and outputting a new bit string containing a first error correction signal based on at least one bit string among the plurality of bit strings output from said dividing means;

second error correction signal creating means for adding second error correction signals to the new bit string containing the first error correction signal output from said first error correction signal creating means and the plurality of bit strings output from said dividing means and outputting them;

primary modulation means for performing (primary modulation on) a plurality of first carrier signals of different frequencies based on the plurality of bit strings output from said second error detection signal adding means;

secondary modulation means for performing (secondary modulation on) the plurality of first carrier signals modulated by said primary modulation means by a spread spectrum system and outputting a plurality of second carrier signals;

transmission means for transmitting the plurality of second carrier signals output from said secondary modulation means to said radio transmission path in parallel;

receiving means for receiving the plurality of second carrier signals of different frequencies transmitted from another radio station via said radio transmission path;

secondary demodulation means for performing (secondary demodulation on) the plurality of second carrier signals received by said receiving means in synchronism with the secondary modulating operation by said secondary modulation means of said another radio station and outputting the plurality of first carrier signals;

primary demodulation means for performing (primary demodulation on) the plurality of first carrier signals output from said secondary demodulation means and outputting a plurality of reception bit strings of base band;

first error correction means for correcting a bit error based on a second error detection signal contained in the reception bit string for each of the plurality of reception bit strings output from said primary demodulation means;

second error correction means for correcting an error of the reception bit string in which an error remains when the error remains in the result of error correction by said first error correction means based on a reception bit string among said plurality of reception bit strings which contains a first error correction signal and then outputting the same; and synthesizing means for combining together the plurality of reception bit strings output from said second error correction means to reproduce the received data string.

9. An error correction method used in a system for transmitting communication data between a plurality of radio stations by dividing at least part of a transmission data string into a plurality of bit strings and modulating a plurality of carrier frequencies by the bit strings, characterized in that said error correction method comprises:

a step of creating and outputting a new bit string containing an error correction signal based on at least one bit string among said plurality of bit strings in the radio station which transmits the communication data;

a step of adding error detection signals to the new bit string containing the error correction signal and said plurality of bit strings in the radio station which transmits the communication data;

a step of detecting a bit error based on an error detection signal contained in the reception bit string for each of a plurality of modulated reception bit strings in the radio station which has received the transmission data; and a step of correcting an error of the reception bit string in which the bit error is detected based on the error detection signal according to that bit string of said plurality of reception bit strings which contains the error correction signal in the radio station which has received the transmission data.

10. An error correction method used in a system for transmitting communication data between a plurality of radio stations by dividing at least part of a transmission data string into a plurality of bit strings and modulating a plurality of carrier frequencies by the bit strings, characterized in that said error correction method comprises:

a step of creating a new bit string containing a first error correction signal based on at least one bit string among said plurality of bit strings in the radio station which transmits the communication data;

a step of adding second error detection signals to the new bit string containing the first error correction signal and said plurality of bit strings in the radio station which transmits the communication data;

a step of correcting a bit error based on the second error detection signal contained in the reception bit string for each of a plurality of modulated reception bit strings in the radio station which has received the transmission data; and a step of correcting an error of a reception bit string in which an error remains when the error remains in the result of error correction based on said second error detection signal according to that reception bit string of said plurality of reception bit strings which contains the second error correction signal in the radio station which has received the transmission data.

11. A radio information communication system for transmitting data between a plurality of radio stations via a radio transmission path, characterized in that;

said radio station comprises:

dividing means for dividing at least part of a transmission data string into a plurality of bit strings and outputting the same;

collision detection signal adding means for adding a plurality of collision detection pulses at random timings to a first period of the head end of the plurality of bit strings output from said dividing means;

primary modulation means for performing (primary modulation on) a plurality of first carrier signals of different frequencies based on the plurality of bit strings output from said collision detection signal adding means;

secondary modulation means for performing (secondary modulation on) the plurality of first carrier signals modulated by said primary modulation means by a spread spectrum system and outputting a plurality of second carrier signals;

transmission means for transmitting the plurality of second carrier signals output from said secondary modulation means to said radio transmission path in parallel;

receiving means for receiving the plurality of second carrier signals of different frequencies transmitted from another radio station via said radio transmission path;

secondary demodulation means for performing (secondary demodulation on) the plurality of second carrier signals received by said receiving means in synchronism with the secondary modulating operation by said secondary modulation means of said another radio station and outputting a plurality of first carrier signals;

primary demodulation means for performing (primary demodulation on) the plurality of first carrier signals output from said secondary demodulation means and outputting a plurality of reception bit strings of base band;

determining means for determining whether a signal other than a collision detection signal transmitted by itself is contained in a second period including the first period of the head end of the plurality of reception bit strings output from said primary demodulation means; and synthesizing means for combining together the plurality of reception bit strings output from said primary demodulating means to reproduce the received data string.

12. A signal collision detection method used in a system for transmitting a transmission signal between a plurality of radio stations via a radio transmission path, characterized in that said signal collision detection method comprises:

a step of permitting that radio station among said plurality of radio stations which requests transmission of communication data to transmit a plurality of collision detection pulses at random timings in a preset first period prior to transmission of the communication signal;

a step of permitting the radio station which requests transmission of the communication signal to determine whether or not reception of a collision detection signal other than the collision detection signal transmitted by itself occurs in a second period including the first period; and a step of detecting collision of a signal in said radio transmission path based on the determination result in said step.

13. A signal collision detection method according to claim (12), characterized in that said step of transmitting the collision detection signal determines whether a communication signal already exists in said radio transmission path or not prior to transmission of the collision detection signal, and transmits the plurality of collision detection pulses at random timings to said radio transmission path in the first preset period when it is determined that no communication signal exists in said radio transmission path.

14. A signal collision detection method used in a system for transmitting a transmission signal between a plurality of radio stations via a radio transmission path, characterized in that said signal collision detection method comprises:

a step of permitting that radio station among said plurality of radio stations which requests transmission of communication data to generate and transmit a collision detection signal constructed by a preset number of random pulse trains in a preset first period prior to transmission of the communication signal;

a step of permitting the radio station which does not request transmission of the communication signal to determine whether pulses of a number exceeding said preset number have received or not in a second period including the first period; and a step of detecting collision of a signal in said radio transmission path based on the determination result in said step.

15. A radio information communication system for transmitting data between a plurality of radio stations via a radio transmission path, characterized in that;

said radio station comprises:
dividing means for dividing at least part of a transmission data string into a plurality of bit strings and outputting the same;

address inserting means for inserting the entire information of at least address information among the transmission data string into the plurality of bit strings output from said dividing means;

primary modulation means for performing (primary modulation on) a plurality of first carrier signals of different frequencies based on the plurality of bit strings into which the entire information of the address information is inserted by said address inserting means; and transmission means for transmitting the plurality of first carrier signals output from said primary modulation means to said radio transmission path in parallel.

16. A radio information communication system for transmitting data between a plurality of radio stations via a radio transmission path, characterized in that;

said radio station comprises:
dividing means for dividing at least part of a transmission data string into a plurality of bit strings and outputting the same;

address inserting means for inserting at least address information of the transmission data string into a plurality of portions of at least one bit string output from said dividing means;

primary modulation means for performing (primary modulation on) a plurality of first carrier signals of different frequencies based on said plurality of bit strings including the bit string into which the address information is inserted by said address inserting means; and transmission means for transmitting the plurality of first carrier signals output from said primary modulation means to said radio transmission path in parallel.

17. A radio information communication system for transmitting data between a plurality of radio stations via a radio transmission path, characterized in that;

said radio station comprises:
dividing means for dividing at least part of a transmission data string into a plurality of bit strings and outputting the same;

error correction signal creating means for creating and outputting a new bit string containing an error correction signal based on at least one bit string among the plurality of bit strings output from said dividing means;

error detection signal adding means for adding error detection signals to the new bit string containing the error correction signal output from said error correction signal creating means and the plurality of bit strings output from said dividing means and then outputting them;

primary modulation means for performing (primary modulation on) a plurality of first carrier signals of different frequencies based on the plurality of bit strings output from said error detection signal adding means; and transmission means for transmitting the plurality of first carrier signals modulated by said primary modulation means to said radio transmission path in parallel.

18. A radio information communication system for transmitting data between a plurality of radio stations via a radio transmission path, characterized in that;

said radio station comprises:
- dividing means for dividing at least part of a transmission data string into a plurality of bit strings and outputting the same;
- first error correction signal creating means for creating and outputting a new bit string containing a first error correction signal based on at least one bit string among the plurality of bit strings output from said dividing means;
- second error correction signal creating means for adding second error detection signals to the new bit string containing the first error correction signal output from said first error correction signal creating means and the plurality of bit strings output from said dividing means and outputting them;
- primary modulation means for performing (primary modulation on) a plurality of first carrier signals of different frequencies based on the plurality of bit strings output from said second error detection signal adding means; and
- transmission means for transmitting the plurality of first carrier signals modulated by said primary modulation means to said radio transmission path in parallel.

19. A radio information communication system for transmitting data between a plurality of radio stations via a radio transmission path, characterized in that;

said radio station comprises:
- dividing means for dividing at least part of a transmission data string into a plurality of bit strings and outputting the same;
- error correction signal creating means for creating and outputting a new bit string containing an error correction signal based on at least one bit string among the plurality of bit strings output from said dividing means;
- error detection signal adding means for adding error detection signals to the new bit string containing the error correction signal output from said error correction signal creating means and the plurality of bit strings output from said dividing means and outputting them;
- primary modulation means for performing (primary modulation on) a plurality of first carrier signals of different frequencies based on the plurality of bit strings output from said error detection signal adding means;
- transmission means for transmitting the plurality of first carrier signals output from said primary modulation means to said radio transmission path in parallel;
- receiving means for receiving the plurality of first carrier signals of different frequencies transmitted from another radio station via said radio transmission path;
- primary demodulation means for performing (primary demodulation on) the plurality of first carrier signals received by said receiving means and outputting a plurality of reception bit strings of base band;
- error detection means for detecting a bit error based on an error detection signal contained in the reception bit string for each of the plurality of reception bit strings output from said primary demodulation means;
- error correction means for correcting an error of a bit string in which a bit error is detected by said error detection means based on a bit string among said plurality of reception bit strings which contains an error correction signal and then outputting the same; and
- synthesizing means for combining together the plurality of reception bit strings output from said error correction means to reproduce the received data string.

20. A radio information communication system for transmitting data between a plurality of radio stations via a radio transmission path, characterized in that;

said radio station comprises:
- dividing means for dividing at least part of a transmission data string into a plurality of bit strings and outputting the same;
- first error correction signal creating means for creating and outputting a new bit string containing a first error correction signal based on at least one bit string among the plurality of bit strings output from said dividing means;
- second error correction signal creating means for adding second error detection signals to the new bit string containing the error correction signal output from said first error correction signal creating means and the plurality of bit strings output from said dividing means and outputting them;
- primary modulation means for performing (primary modulation on) a plurality of first carrier signals of different frequencies based on the plurality of bit strings output from said second error detection signal adding means;
- transmission means for transmitting the plurality of first carrier signals output from said primary modulation means to said radio transmission path in parallel;
- receiving means for receiving the plurality of first carrier signals of different frequencies transmitted from another radio station via said radio transmission path;
- primary demodulation means for performing (primary demodulation on) the plurality of first carrier signals received by said receiving means and outputting a plurality of reception bit strings of base band;
- first error correction means for correcting a bit error based on a second error correction signal contained in the reception bit string for each of the plurality of reception bit strings output from said primary demodulation means;
- second error correction means for correcting an error of a bit string in which a bit error remains when the error remains in the result of error correction by said first error correction means based on a reception bit string among said plurality of reception bit strings which contains a first error correction signal and then outputting the same; and
- synthesizing means for combining together the plurality of reception bit strings output from said second error correction means to reproduce the received data string.

21. A radio information communication system for transmitting data between a plurality of radio stations via a radio transmission path, characterized in that;

said radio station comprises:
- dividing means for dividing at least part of a transmission data string into a plurality of bit strings and outputting the same;

collision detection signal adding means for adding a plurality of collision detection pulses at random timings to a first period of the head end of the plurality of bit strings output from said dividing means;

primary modulation means for performing (primary modulation on) a plurality of first carrier signals of different frequencies based on the plurality of bit strings output from said collision detection signal adding means;

transmission means for transmitting the plurality of first carrier signals modulated by said primary modulation means to said radio transmission path in parallel;

receiving means for receiving the plurality of first carrier signals of different frequencies transmitted from another radio station via said radio transmission path;

primary demodulation means for performing (primary demodulation on) the plurality of first carrier signals received by said receiving means and outputting a plurality of reception bit strings of base band;

determining means for determining whether or not a signal other than the collision detection signal transmitted by itself exists in a second period including the first period of the head end of the plurality of reception bit strings output from said primary demodulation means; and synthesizing means for combining together the plurality of reception bit strings output from said primary demodulation means to reproduce the received data string.

* * * * *